US009176245B2

(12) United States Patent
Craig

(10) Patent No.: US 9,176,245 B2
(45) Date of Patent: Nov. 3, 2015

(54) REFINING INFORMATION ON SUBTERRANEAN FRACTURES

(75) Inventor: David P. Craig, Thornton, CO (US)

(73) Assignee: Halliburton Energy Services, Inc., Houston, TX (US)

( * ) Notice: Subject to any disclaimer, the term of this patent is extended or adjusted under 35 U.S.C. 154(b) by 630 days.

(21) Appl. No.: 12/626,039

(22) Filed: Nov. 25, 2009

(65) Prior Publication Data

US 2011/0120706 A1    May 26, 2011

(51) Int. Cl.
| | |
|---|---|
| G06F 7/60 | (2006.01) |
| G06F 17/10 | (2006.01) |
| G06G 7/56 | (2006.01) |
| G06G 7/48 | (2006.01) |
| G06G 7/50 | (2006.01) |
| G01V 1/28 | (2006.01) |
| E21B 43/26 | (2006.01) |

(52) U.S. Cl.
CPC .............. *G01V 1/282* (2013.01); *E21B 43/26* (2013.01)

(58) Field of Classification Search
CPC ........ E21B 43/00; G01V 99/005; G01V 3/38; G01V 1/28; G01V 2210/66; G06F 17/5009; G06F 17/50; G06F 17/17; G06F 17/5086; G06F 2217/16; G06N 7/005
USPC .............................................. 703/10, 2, 5, 9
See application file for complete search history.

(56) References Cited

U.S. PATENT DOCUMENTS

| | | |
|---|---|---|
| 3,682,246 A | 8/1972 | Closmann |
| 4,200,152 A | 4/1980 | Foster et al. |
| 4,797,821 A | 1/1989 | Petak et al. |
| 5,747,750 A * | 5/1998 | Bailey et al. .................. 181/112 |
| 5,890,536 A | 4/1999 | Nierode et al. |
| 5,992,519 A | 11/1999 | Ramakrishnan et al. |
| 6,101,447 A | 8/2000 | Poe, Jr. |

(Continued)

FOREIGN PATENT DOCUMENTS

| | | |
|---|---|---|
| JP | H07270300 | 10/1995 |
| WO | WO 2008/070526 | 6/2008 |
| WO | WO 2008/075242 | 6/2008 |

OTHER PUBLICATIONS

Xiaoyan Liu, NPL, "Multiple-point statistical prediction on fracture networks at Yucca Mountain", May 19, 2009.*

(Continued)

*Primary Examiner* — Saif Alhija
*Assistant Examiner* — Angel Calle
(74) *Attorney, Agent, or Firm* — Craig W. Roddy; Fish & Richardson P.C.

(57) ABSTRACT

Systems, methods, and instructions encoded in a computer-readable medium can perform operations related to refining information on characteristics of natural fractures of a subterranean formation. Fracture pattern models are generated based on sampling an initial distribution of values for a fracture parameter. Each fracture pattern model may include, for example, a model of natural fractures in a subterranean formation. Each fracture pattern model is compared to microseismic event data for a subterranean region. A refined distribution for the fracture parameter is generated based on the comparison. Generating the refined distribution may include, for example, selecting values of the fracture parameter from fracture pattern models that correlate with the microseismic event data. In some implementations, an injection treatment may be simulated and/or designed based on the refined distribution.

39 Claims, 16 Drawing Sheets

(56) References Cited

U.S. PATENT DOCUMENTS

| | | | |
|---|---|---|---|
| 6,325,147 | B1 | 12/2001 | Doerler et al. |
| 6,389,361 | B1* | 5/2002 | Geiser ............................ 702/15 |
| 6,957,145 | B2 | 10/2005 | Spross |
| 7,054,751 | B2 | 5/2006 | Craig |
| 7,079,952 | B2 | 7/2006 | Thomas et al. |
| 7,272,973 | B2 | 9/2007 | Craig |
| 7,389,185 | B2 | 6/2008 | Craig |
| 7,445,045 | B2 | 11/2008 | East, Jr. et al. |
| 7,472,748 | B2 | 1/2009 | Gdanski et al. |
| 7,543,635 | B2 | 6/2009 | East et al. |
| 7,580,796 | B2 | 8/2009 | Soliman et al. |
| 7,660,194 | B2 | 2/2010 | Uhl et al. |
| 7,890,307 | B2 | 2/2011 | Geehan et al. |
| 2002/0043370 | A1 | 4/2002 | Poe |
| 2002/0049575 | A1 | 4/2002 | Jalali et al. |
| 2002/0120429 | A1* | 8/2002 | Ortoleva ........................... 703/2 |
| 2003/0050758 | A1 | 3/2003 | Soliman et al. |
| 2003/0062159 | A1 | 4/2003 | Nasr |
| 2003/0136558 | A1 | 7/2003 | Wellington et al. |
| 2005/0028975 | A1 | 2/2005 | Al-Muraikhi |
| 2005/0125209 | A1 | 6/2005 | Soliman et al. |
| 2005/0149307 | A1 | 7/2005 | Gurpinar et al. |
| 2005/0203723 | A1 | 9/2005 | Geehan et al. |
| 2006/0081412 | A1 | 4/2006 | Wright et al. |
| 2006/0102342 | A1 | 5/2006 | East et al. |
| 2006/0155473 | A1 | 7/2006 | Soliman et al. |
| 2006/0283589 | A1 | 12/2006 | Sayers |
| 2007/0062273 | A1 | 3/2007 | Kalfayan et al. |
| 2007/0125543 | A1 | 6/2007 | McNeel et al. |
| 2007/0125544 | A1 | 6/2007 | Robinson et al. |
| 2007/0183260 | A1 | 8/2007 | Lee et al. |
| 2007/0201305 | A1 | 8/2007 | Heilman et al. |
| 2007/0215345 | A1* | 9/2007 | Lafferty et al. ............ 166/250.1 |
| 2007/0235189 | A1 | 10/2007 | Milne et al. |
| 2007/0272407 | A1* | 11/2007 | Lehman et al. ............ 166/250.1 |
| 2007/0294034 | A1 | 12/2007 | Bratton et al. |
| 2008/0004847 | A1* | 1/2008 | Bradford ........................ 703/10 |
| 2008/0087428 | A1 | 4/2008 | Symington et al. |
| 2008/0091396 | A1 | 4/2008 | Kennon et al. |
| 2008/0120034 | A1 | 5/2008 | Georgi et al. |
| 2008/0133186 | A1 | 6/2008 | Li et al. |
| 2008/0133193 | A1 | 6/2008 | Gdanski et al. |
| 2008/0133194 | A1 | 6/2008 | Klumpen et al. |
| 2008/0183451 | A1* | 7/2008 | Weng et al. ..................... 703/10 |
| 2008/0209997 | A1 | 9/2008 | Bailey et al. |
| 2008/0236818 | A1 | 10/2008 | Dykstra |
| 2009/0037112 | A1 | 2/2009 | Soliman et al. |
| 2009/0065207 | A1 | 3/2009 | Shenoy et al. |
| 2009/0090505 | A1 | 4/2009 | McDaniel et al. |
| 2009/0125240 | A1* | 5/2009 | den Boer et al. ................ 702/11 |
| 2009/0125280 | A1 | 5/2009 | Soliman et al. |
| 2009/0145599 | A1 | 6/2009 | Siebrits et al. |
| 2009/0194273 | A1 | 8/2009 | Surjaatmadja et al. |
| 2009/0248312 | A1 | 10/2009 | Hsu et al. |
| 2010/0032156 | A1 | 2/2010 | Petty et al. |
| 2010/0036614 | A1* | 2/2010 | Zuercher ........................ 702/16 |
| 2010/0057418 | A1 | 3/2010 | Li et al. |
| 2010/0081184 | A1 | 4/2010 | Downey et al. |
| 2010/0224365 | A1 | 9/2010 | Abad |
| 2010/0252268 | A1* | 10/2010 | Gu et al. ..................... 166/308.1 |
| 2010/0307755 | A1 | 12/2010 | Xu et al. |
| 2010/0312529 | A1 | 12/2010 | Souche et al. |
| 2011/0029293 | A1 | 2/2011 | Petty et al. |
| 2011/0067857 | A1 | 3/2011 | Underhill et al. |
| 2011/0110191 | A1* | 5/2011 | Williams-Stroud et al. ..... 367/73 |
| 2011/0119040 | A1* | 5/2011 | McLennan ........................ 703/2 |
| 2011/0120706 | A1 | 5/2011 | Craig |
| 2011/0172977 | A1 | 7/2011 | Kolbjornsen et al. |
| 2011/0213602 | A1 | 9/2011 | Dasari |

OTHER PUBLICATIONS

Fernando A. Neves, NPL, "Detection of potential fractures and small faults using seismic attributes", Sep. 2004.*

Yingqi Zhang, NPL, "Percolation-theory and fuzzy rule-based probability estimation of fault leakage at geologic carbon sequestration sites", Mar. 18, 2009.*

Notification of Transmittal of the International Search Report and the Written Opinion of the International Searching Authority, or Declaration (1 page); International Search Report (3 pages); and Written Opinion of the International Searching Authority (5 pages), mailed Oct. 27, 2011, for international application PCT/GB2010/002176.

Butler, J.J., Jr.: "The Performance of Slug Tests," *The Design, Performance, and Analysis of Slug Tests*, Lewis Publishers, Boca Raton (1997), 6 pages.

Ramey, H.J. Jr. and Gringarten, A.C.: "Effect of High Volume Vertical Fractures on Geothermal Steam Well Behavior," Proc. Second United Nations Symposium on the Use and Development of Geothermal Energy, San Francisco (May 20-29, 1975), 4 pages.

Harrison, J.P. and Hudson, J.A.: "Part 2: Illustrative worked examples," Engineering Rock Mechanics, Pergamon, Oxford, 2000, 492 pages.

Shi, G.-H.: "Numerical Manifold Method," Proceeding of the Working Forum on the Manifold of Material Analysis (1997), 128 pages.

Priest, S.D., "Discontinuity Analysis for Rock Engineering," Chapman and Hall (1993), 490 pages.

Sageev, A. and Ramey, H.J., Jr., "On Slug Test Analysis in Double-Porosity Reservoirs," SPE 15479, 61st Annual Technical Conference and Exhibition of the Society of Petroleum Engineers, New Orleans, LA Oct. 5-8, 1986, 12 pages.

Lorenz, J.C. et al., "Fracture Characteristics and Reservoir of Stress-Sensitive Fracture Systems in Flat Lying Lenticular Formations," paper SPE 15244, Unconventional Gas Technology Symposium, Louisville, Kentucky, May 18-21, 1986, 14 pages.

Fisher et al., "Integrating Fracture-Mapping Technologies to Improve Stimulations in the Barnett Shale," SPE 77441, May 2005 SPEC Production & Facilities, 9 pages.

Notification of Transmittal of the International Search Report and the Written Opinion of the International Searching Authority, or Declaration (1 page); International Search Report (3 pages); and Written Opinion of the International Searching Authority (7 pages), mailed Oct. 27, 2011, for international application PCT/GB2010/002174.

Notification of Transmittal of the International Search Report and the Written Opinion of the International Searching Authority, or Declaration (1 page); International Search Report (3 pages); and Written Opinion of the International Searching Authority (7 pages), mailed Jan. 19, 2012, for international application PCT/GB2010/002173.

Koenig, R.A. and Schraufnagel, R.A.: "Application of the Slug Test in Coalbed Methane Testing," paper 8743 presented at the 1987 Coalbed Methane Symposium, Tuscaloosa, Alabama, Nov. 17, 1987, pp. 195-205.

Jochen, J.E., et al. "Quantifying Layered Reservoir Properties With a Novel Permeability Test," paper SPE 25864 prepared for presentation at the 1993 SPE Rocky Mountain Regional/Low Permeability Reservoirs Symposium, Denver, Colorado, Apr. 12-14, 1993, pp. 261-268.

Frantz, J.H., Jr. et al.: "Novel Well Testing Procedures Prove Successful in Dakota Formation Infill Program, San Juan Basin," paper SPE 71519 prepared for presentation at the 2001 SPE Annual Technical Conference and Exhibition, New Orleans, Louisiana, Sep. 30-Oct. 3, 2001, 8 pgs.

Ramey, H.J., Jr. and Agarwal, R.G.: "Annulus Unloading Rates As Influenced by Wellbore Storage and Skin Effect," *SPEJ* (Oct. 1972); *Trans.* AIME, 253, pp. 453-462.

Ramey, H.J., Jr., Agarwal, R.G., and Martin, I.: "Analysis of 'Slug Test' or DST Flow Period Data," *J. Cdn. Pet. Tech.* (Jul.-Sep. 1975) pp. 37-47.

Mateen, Khalid and Ramey, H.J., Jr.: "Slug Test Data Analysis in Reservoirs With Double Porosity Behavior," paper SPE 12779 prepared for presentation at the 1984 California Regional Meeting, Long Beach, California, Apr. 11-13, 1984, pp. 459-468.

Grader, A. and Ramey, H.J., Jr.: "Slug Test Analysis in Double-Porosity Reservoirs," SPE Formulation Evaluation, Jun. 1988, pp. 329-339.

Rushing, J.A. et al.: "Analysis of Slug Test Data From Hydraulically Fractured Coalbed Methane Wells," paper SPE 21492 prepared for

(56) References Cited

OTHER PUBLICATIONS presentation at the SPE Gas Technology Symposium, Houston, Texas, Jan. 23-25, 1991, pp. 105-118.

Mayerhofer, M.J., Ehlig-Economides, C.A., and Economides, M.J.: "Pressure-Transient Analysis of Fracture-Calibration Tests," *JPT* (Mar. 1995) pp. 229-234.

Laubach, S.E.: "Fracture networks in selected Cretaceous sandstones of the Green River and San Juan Basins," *Geological studies relevant to horizontal drilling: examples from western North America,* Rocky Mountain Association of Geologists, Denver, Colorado (1992) pp. 115-127.

Lorenz, J.C. et al.: "Fracture Characteristics and Reservoir Behavior of Stress-Sensitive Fracture Systems in Flat-Lying Lenticular Formations," Journal of Petroleum Technology, Jun. 1989, pp. 615-622.

Craig, D.P. et al.: "Permeability, Pore Pressure, and Leakoff-Type Distributions in Rocky Mountain Basins," paper SPE 75717 prepared for presentation at the SPE Gas Technology Symposium, Calgary, Alberta, Canada, Apr. 30-May 2, 2002, 13pgs.

Warren, J.E. and Root, P.J.: "The Behavior of Naturally Fractured Reservoirs," SPEJ (Sep. 1963) pp. 245-255.

Cinco-Ley, H. and Meng, H.-Z.: "Pressure Transient Analysis of Wells With Finite Conductivity Vertical Fractures in Dual Porosity Reservoirs," paper SPE 18172 prepared for presentation at the 1988 SPE Annual Technical Conference and Exhibition, Houston, Texas, Oct. 2-5, 1988, pp. 645-660.

Barree, R.D. and Mukherjee, H.: "Determination of Pressure Dependent Leakoff and Its Effect on Fracture Geometry," paper SPE 36424 prepared for presentation at the 1996 SPE Annual Technical Conference and Exhibition, Denver, Colorado, Oct. 6-9, 1996, 10 pgs.

Abousleiman, Y., Cheng, A. H-D., and Gu, H.: Formation Permeability Determination by Micro or Mini-Hydraulic Fracturing, *J. of Energy Resources Technology* (Jun. 1994) vol. 116, pp. 104-114.

Nolte, K.G.: "Determination of Fracture Parameters From Fracturing Pressure Decline," paper SPE 8341 prepared for presentation at the 1979 SPE Annual Technical Conference and Exhibition, Dallas, Texas, Sep. 23-25, 1979, 16 pgs.

Castillo, J.L.: "Modified Fracture Pressure Decline Analysis Including Pressure-Dependent Leakoff," paper SPE 16417 prepared for presentation at the 1987 SPE/DOE Low Permeability Reservoirs Symposium, Denver, Colorado, May 18-19, 1987, pp. 273-281.

Mayerhofer, M.J. and Economides, M.J.: "Permeability Estimation From Fracture Calibration Treatments," paper SPE 26039 prepared for presentation at the 1993 Western Regional Meeting, Anchorage, Alaska, May 26-28, 1993, pp. 117-128.

Gringarten, A.C., Ramey, H.J., Jr., Raghavan, R.: "Unsteady-State Pressure Distributions Created by a Well With a Single Infinite-Conductivity Vertical Fracture," *SPEJ* (Aug. 1974) pp. 347-360.

Cinco-Ley, H. and Samaniego-V., F.: "Transient Pressure Analysis: Finite Conductivity Fracture Case Versus Damage Fracture Case," paper SPE 10179 prepared for presentation at the 1981 SPE Annual Technical Conference and Exhibition, San Antonio, Texas, Oct. 5-7, 1981, 19 pages.

Ehlig-Economides, C.A., Fan, Y., and Economides, M.J.: "Interpretation Model for Fracture Calibration Tests in Naturally Fractured Reservoirs," paper SPE 28690 prepared for presentation at the 1994 SPE International Petroleum Conference and Exhibition of Mexico, Veracruz, Mexico, Oct. 10-13, 1994, 10 pages.

Peres, A.M.M., Onur, M., and Reynolds, A.C.: "A New General Pressure-Analysis Procedure for Slug Tests," *SPEFE* (Dec. 1993) pp. 292-298.

Xiao, J.J. and Reynolds, A.C.: "A Pseudopressure-Pseudotime Transformation for the Analysis of Gas Well Closed Chamber Tests," paper SPE 25879 prepared for presentation at the 1993 SPE Rocky Mountain Regional/Low-Permeability Reservoirs Symposium, Denver, Colorado, Apr. 12-14, 1993, pp. 417-428.

Elbel, J.L. and Mack, M.G.:"Refracturing: Observation and Theories," paper SPE 25464 prepared for presentation at the 1993 SPE Production Operations Symposium, Oklahoma City, Oklahoma, Mar. 21-23, 1993, pp. 521-531.

Biot, M.A.: "General Theory of Three-Dimensional Consolidation," *Journal of Applied Physics* (Feb. 1941) vol. 12, pp. 155-164.

Biot, M.A.: "Theory of Elasticity and Consolidation for a Porous Anisotropic Solid," *Journal of Applied Physics* (Feb. 1955) vol. 26, No. 2, pp. 182-185.

Chen, H.-Y., Teufel, L.W., and Lee, R.L.: "Coupled Fluid Flow and Geomechanics in Reservoir Study—I. Theory and Governing Equations," paper SPE 30752 prepared for presentation at the 1995 SPE Annual Technical Conference & Exhibition, Dallas, Texas, Oct. 22-25, 1995, pp. 507-519.

Osorio, J.G., Chen, H.-Y., and Teufel, L.W.: "Numerical Simulation of the Impact of Flow-Induced Geomechanical Response on the Productivity of Stress-Sensitive Reservoirs," paper SPE 51929 prepared for presentation at the 1999 SPE Reservoir Simulation Sypmosium, Houston, Texas, Feb. 14-17, 1999, 15 pgs.

Chen, H.-Y. and Teufel, L.W.: "Coupling Fluid-Flow and Geomechanics in Dual-Porosity Modeling of Naturally Fractured Reservoirs," paper SPE 38884 prepared for presentation at the 1997 SPE Annual Technical Conference and Exhibition, San Antonio, Texas, Oct. 5-8, 1997, pp. 419-433.

Chen, H.-Y. and Teufel, L.W.: "Coupling Fluid-Flow and Geomechanics in Dual-Porosity Modeling of Naturally Fractured Reservoirs—Model Description and Comparison," paper SPE 59043 prepared for presentation at the 2000 SPE International Petroleum Conference and Exhibition in Mexico, Villahermosa, Mexico, Feb. 1-3, 2000, 10 pgs.

Jing, L.:"Formulation of Discontinuous Deformation Analysis (DDA)—An Implicit Discrete Element Model for Block Systems," *Engineering Geology* (1998) 49, pp. 371-381.

Shi, G.-H. *Block System Modeling by Discontinuous Deformation Analysis,* Computational Mechanics Publications, Boston, Massachusetts (1993), 210 pages.

Couples, G.D., et al.:"Upscaling Fluid-Flow and Geomechanical Properties in Coupled Matrix+Fractures+Fluid Systems," paper SPE 79696 prepared for presentation at the 2003 SPE Reservoir Simulation Symposium, Houston, Texas, Feb. 3-5, 2003, 8 pgs.

Jing, L., Ma, Y., and Fang, Z.: "Modeling of Fluid Flow and Solid Deformation for Fractured Rocks with Discontinuous Deformation Analysis (DDA) Method," *Int. J. Rock Mech. & Mining Science* (2001) 38, pp. 343-355.

Lin, C.T., et al.: "Extensions of Discontinuous Deformation Analysis for Jointed Rock Masses," *Inj. J. Rock Mech. Min. Sci. & Geomech. Abstr.* (1996) vol. 33, No. 7, pp. 671-693.

Spivey, J.P. and Lee, W.J.:"Variable Wellbore Storage Models for a Dual-vol. Wellbore," paper SPE 56615 prepared for presentation at the 1999 SPE Annual Technical Conference and Exhibition, Houston, Texas, Oct. 3-6, 1999, 10 pgs.

Bagheri, M. and Satan, A.: "Modeling of Geomechanics in Naturally Fractured Reservoirs," SPERE&E (Feb. 2008), pp. 108-118.

Bastian, P.A., Wirth, O.F.R., Wang, L., and Voneiff, G.W.: "Assessment and Development of the Dry Horseshoe Canyon CBM Play in Canada," paper SPE 96899 prepared for presentation at the 2005 SPE Annual Technical Conference and Exhibition, Dallas, Texas, Oct. 9-12, 2005, 13 pgs.

Jing, L. and Stephansson, O.: "Fundamentals of Discrete Element Methods for Rock Engineering—Theory and Applications", Elsevier, New York (2008), 545pgs.

Murtha, J.A.: "Distinguished Author Series—Monte Carlo Simulation: Its Status and Future," *JPT* (Apr. 1997), pp. 361-373.

Nolte, K.G. and Economides, M.J.: "Fracture Design and Validation With Uncertainty and Model Limitations," *JPT* (Sep. 1991), pp. 1147-1155.

Olson, J.E., and Dahi-Taleghani, A.: "Modeling Simultaneous Growth of Multiple Hydraulic Fractures and Their Interaction With Natural Fractures," paper SPE 119739 prepared for presentation at the 2009 SPE Hydraulic Fracturing Technology Conference, The Woodlands, Texas, Jan. 19-21, 2009, 7pgs.

Ku, C.Y., "Modeling of Jointed Rock Masses Based on the Numerical Manifold Method," PhD Dissertation, University of Pittsburgh, 2001, 241 pgs.

(56) References Cited

OTHER PUBLICATIONS

Craig, D.P. "Modeling Fracture—Injection/Falloff Tests in Deformable Naturally Fractured Reservoir Systems," Dissertation Proposal to Dr. Thomas A. Blasingame, Texas A&M University, on or about Aug. 20, 2003, 14 pgs.

Warpinski, N.R., Mayerholer, M.J., Vincent, M.C. Cipolla, C.L., Lolon, E.P.: "Stimulating Unconventional Reservoirs: Maximizing Network Growth While Optimizing Fracture Conductivity," paper SPE 114173, prepared for presentation at the SPE Unconventional Reservoirs Conference, Keystone, Colorado, Feb. 10-12, 2008, 19 pgs.

Fisher, M.K., Wright, C.A., Davidson, B.M., Goodwin, A.K., Fielder, E.O., Buckler, W.S., Steinsberger, N.P.: "Integrating Fracture Mapping Technologies to Improve Stimulations in the Barnett Shale," SPE Production & Facilities (20), May 2005, pp. 85-93.

Lin, Jeen-Shang, Ku, Cheng-Yu: "Simulation of Slope Failure Using a Meshed Based Partition of Unity Method," 15$^{th}$ ASCE Engineering Mechanics Conference, Columbia University, New York, New York, Jun. 2-5, 2002, 6pgs.

Narayan, S.P., Yang, Z., Rahman, S.S., and Jing, Z.: "Propant Free-Shear Dilation: An Emerging Technology for Exploiting Tight to Ultra-Tight Gas Resources," paper SPE 49251, prepared for presentation at the 1998 SPE Annual Technical Conference and Exhibition, New Orleans, Louisiana, Sep. 27-30, 1998, pp. 687-701.

Warpinski, N.R., Kramm, R.C., Heinze, J.R., Waltman, C.K.: "Comparison of Single-and Dual-Array Microseismic Mapping Techinques in the Barnett Shale," paper SPE 95568, prepared for presentation at the 2005 SPE Annual Technical Conference and Exhibition, Dallas, TX Oct. 9-12, 2005, 10 pgs.

Craig, David, "Using Maps of Microseismic Events to Define Reservoir Discontinuities," Abstract Submitted to SPE on Jan. 25, 2010 (2 pages).

Fernandez, O. "Obtaining a Best Fitting Plane Through 3D Georeferenced Data," Journal of Structural Geology 27, (2005) pp. 855-858.

Dodds, Rich, "Digital Asset Work Flows: Changing the Way We Work," (Jul. 2009) The Digital Oilfield, (2 pages).

Stimulation for the Digital Asset Workflow, The Digital Asset H069373 Jul. 2009 copyright 2009 Halliburton, 2 pages.

Lin, J., Ku, C.; "Two-Scale Modeling of Jointed Rock Masses," International Journal of Rock Mechanics & Mining Sciences 43 (2006), pp. 426-436.

Ku, C et al., "Modeling of Jointed Rock Masses Using a Combined Equivalent-Continuum and Discrete Approach", International Journal of Rock Mechanics and Mining Sciences, vol. 41, No. 3, (2004), 6pgs.

Tran et al., Modeling Discrete Fracture Networks Using Neuro-Fractal—Stochastic Simulation, 2006, Journal of Engineering and Applied Sciences 1 (2), pp. 154-160.

Lu et al, "Hydraulic Fracturing Simulation with Numerical Manifold Method", Proceedings of the 4$^{th}$ International Conference on Analysis of Discontinuous Deformation, published in 2001, 12 pages.

Canadian Office Action issued in CA 2778326 on Sep. 26, 201, 3 pages.

Canadian Office Action issued in CA 2778313 on Sep. 30, 2013, 4 pages.

Canadian Office Action in Canadian Application No. 2,779,804 on Oct. 3, 2013, 3 pages.

Chiou et al., "Mixed Mode Fracture Propagation by Manifold Method", International Journal of Fracture 114: 327-347, Copyright 2002, 21 pages.

Ma et al., "Modeling Fracture Propagation with the Numerical Manifold Method", The 42nd U.S. Rock Mechanics Symposium, Jun. 29-Jul. 2, 2008, 8 pages.

Patent Examination Report 1, AU Patent Application No. 2010322931, Nov. 6, 2014, 3 pages.

Fomin et al., "Simulation of Transport Phenomena in Fractured Rocks with Application to Hot-Dry-Rock Geothermal Systems," Fracture and Reliability Research Institute, Tohoku University, Sendai 980-8579, Japan, 2005, 6 pages.

\* cited by examiner

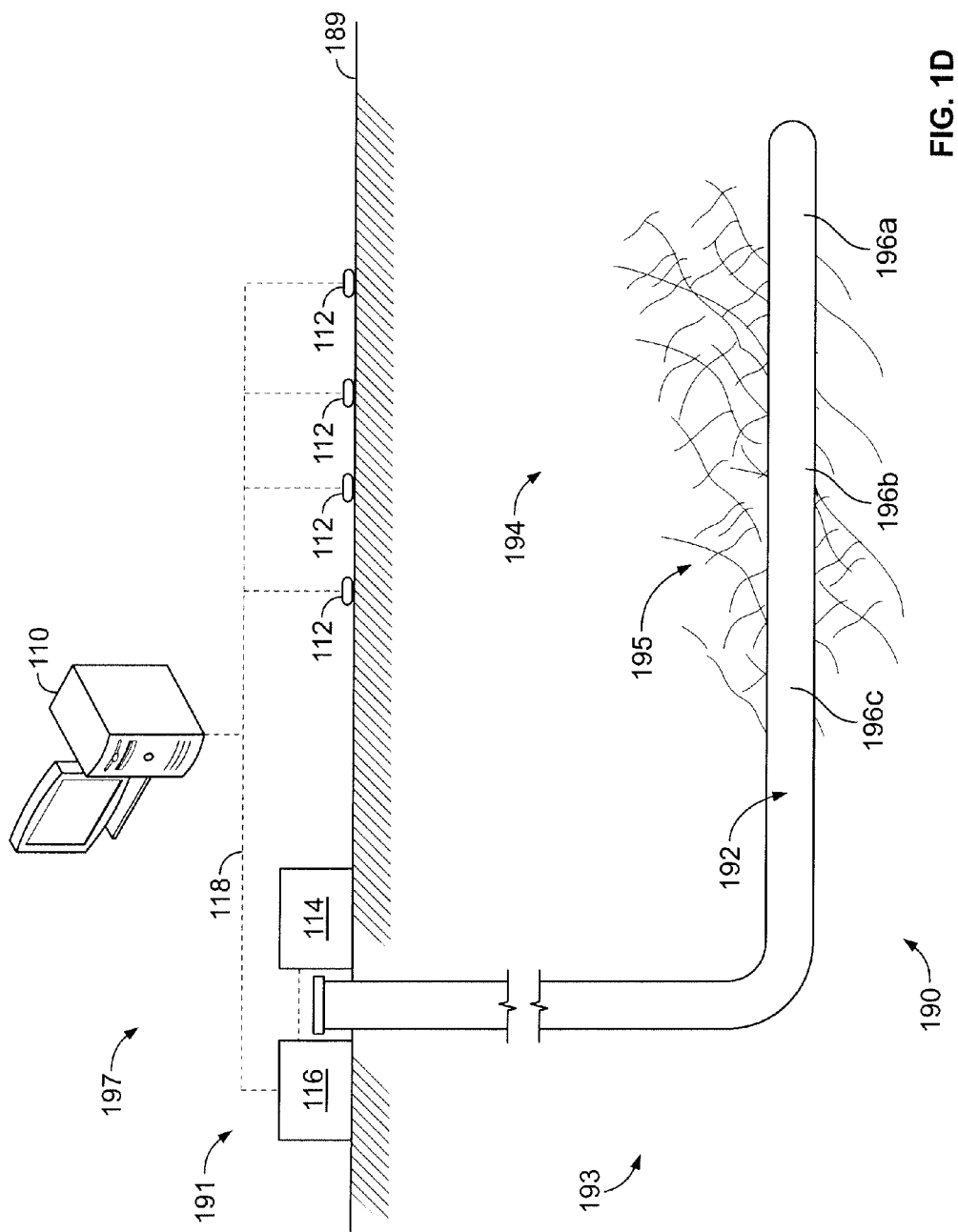

REFINING INFORMATION ON SUBTERRANEAN FRACTURES

BACKGROUND

Oil and gas wells produce oil, gas and/or byproducts from subterranean petroleum reservoirs. Petroleum reservoirs, such as those containing oil and gas, typically include finite-dimensional, discontinuous, inhomogeneous, anisotropic, non-elastic (DIANE) rock formations. Such formations, in their natural state (prior to any fracture treatment), typically include natural fracture networks. Natural fracture networks can include fractures of various sizes and shapes, as well as sets of fractures having different orientations.

During a fracture treatment, fluids are pumped under high pressure into a rock formation through a well bore to artificially fracture the formations and increase permeability and production from the formation. Fracture treatments (as well as production and other activities) can cause complex fracture patterns to develop within the natural fracture pattern in the formation. Complex-fracture patterns can include complex networks of fractures that extend to the well bore, along multiple azimuths, in multiple different planes and directions, along discontinuities in rock, and in multiple regions of a reservoir.

SUMMARY

Systems, methods, and instructions encoded in a computer-readable medium can perform operations related to refining information on properties of fractures of a subterranean formation. In one general aspect, a probability distribution for a natural fracture property is refined based on microseismic data.

In one aspect, multiple fracture pattern models are generated based on sampling a distribution of values for a fracture parameter. Each fracture pattern model is compared to microseismic event data for a subterranean region. A refined distribution for the fracture parameter is generated based on the comparing.

Implementations may include one or more of the following features. Map images are generated. Each map image includes a representation of one of the fracture pattern models and a representation of the microseismic event data. Comparing each generated fracture pattern model to microseismic event data includes presenting the plurality of map images in a graphical user interface. The comparing includes receiving user input through the graphical user interface. The user input identifies at least one of the fracture pattern models as an accurate representation of the microseismic event data, and/or the user input identifies at least one of the fracture pattern models as an inaccurate representation of the microseismic event data. The distribution is an initial distribution. Sampling the initial distribution includes randomly selecting sample values from the initial distribution. Generating the refined distribution includes selecting a subset of the sample values based on the comparing. The comparing includes determining that at least one of the fracture pattern models has a correlation with the microseismic event data higher than a threshold correlation. The comparing includes determining that at least one of the fracture pattern models has a correlation with the microseismic event data lower than a threshold correlation. The fracture pattern models include a first fracture pattern model and a second fracture pattern model. The first fracture pattern model has a first correlation with the microseismic event data. The second fracture pattern model has a second correlation with the microseismic event data. The comparing comprises determining that the first correlation is higher than the second correlation. The microseismic event data includes information on event locations of a plurality of measured microseismic events. The fracture pattern models each include information on locations of fractures. Comparing a fracture pattern model to microseismic event data includes calculating, for each fracture pattern model, a least distance from each of the event locations to one of the fractures in the fracture pattern model. The microseismic event data includes information on event magnitudes of the measured microseismic events. Comparing a fracture pattern model to microseismic event data includes weighting the least distance for each event location based on the event magnitude for the measured microseismic event associated with the event location. Generating the fracture pattern models includes simulating complex fracture propagation in the subterranean region. The fracture pattern models are natural fracture pattern models.

In one aspect, information on a model location of a subterranean fracture is received. The model location is based on an initial distribution of values for a fracture parameter. Data processing apparatus generates a refined distribution of values for the fracture parameter based on comparing the model location of the subterranean fracture and measured locations of microseismic events in a subterranean region.

Implementations may include one or more of the following features. A first volume of the subterranean region includes the measured locations. A natural fracture pattern in a second volume of the subterranean region is predicted based on the refined distribution. The subterranean formation includes a horizontal well bore. The first volume surrounds a first portion of the horizontal well bore. The second volume surrounds a second portion of the horizontal well bore. The fracture parameter relates to a fracture dip angle, a fracture density, a fracture direction, a fracture shape, a fracture aperture, a fracture persistence, a fracture length, and/or a fracture spacing. The initial distribution includes values for the fracture parameter and a probability for each of the values. Generating the refined distribution includes increasing or decreasing the probability for at least one of the values. Information on an additional model location of an additional subterranean fracture is received. The additional model location is based on the refined distribution of values for the fracture parameter. A second refined distribution of values is generated for the fracture parameter based on comparing the additional model location and the measured locations of the microseismic events. The information on the model location of the subterranean fracture is included in first information, and fracture pattern models each including information on model locations of subterranean fractures are received. One of the fracture pattern models includes the first information. Each fracture pattern model is based on an independent sampling of the initial distribution of values for the fracture parameter. The refined distribution is generated based on comparing each of the fracture pattern models and the measured locations of the microseismic events. Comparing each of the fracture pattern models and the measured locations of the microseismic events includes using a display device to display plot. Each plot includes a graphical representation of one of the fracture pattern models and a graphical representation of the microseismic events. The comparing includes receiving through a user interface a selection of at least one of the plots. Comparing each of the fracture pattern models and the measured locations of the microseismic events includes determining distances between the measured locations of the microseismic events and the model locations of each fracture pattern model. Comparing each of the fracture pattern models and the measured locations of the microseismic events includes determining that one or more of the fracture pattern models correlates with the locations of the microseismic events based on the distances and/or determining that one or more of the fracture pattern models does not correlate with the locations of the microseismic events based on the distances. The refined distribution is used to predict values of the parameter for a second subterranean region. An operating parameter for an injection treatment is determined based on the refined distribution. The operating parameter includes at least one of a fluid injection flow rate, a fluid injection flow volume, a fluid injection location, a proppant property, and/or an injection slurry concentration.

In one aspect, a system for performing an injection treatment includes an injection treatment control subsystem and a computing subsystem. The injection treatment control subsystem is adapted to control an injection treatment applied to a subterranean formation through a well bore defined in the subterranean formation. The injection treatment is based on a predicted distribution of value for a natural fracture parameter. The computing subsystem is adapted to generate fracture pattern models by sampling an initial distribution of values for the natural fracture parameter. The computing subsystem is adapted to generate the predicted distribution based on comparing each of the fracture pattern models to microseismic event data for a subterranean region.

Implementations may include one or more of the following features. The subterranean formation resides outside of the subterranean region. The subterranean formation resides in the subterranean region. The computing subsystem is adapted to simulate fracture propagation in the subterranean formation and determine at least one aspect of the injection treatment based on the simulation. The system includes the subterranean formation. The subterranean formation includes shale, sandstone, carbonates, and/or coal. The well bore includes a horizontal well bore.

In one aspect, fracture pattern models are generated based on a distribution of values for a fracture parameter. An updated distribution is generated based on correlations between the fracture pattern models and microseismic event data for a subterranean formation. An injection treatment is designed based on the updated distribution. The injection treatment is applied to the subterranean formation through a well bore in the subterranean formation.

Implementations may include one or more of the following features. Applying the injection treatment includes applying a second injection treatment to the subterranean formation at a second fluid injection location. The microseismic event data is detected during a first injection treatment applied to the subterranean formation at a first fluid injection location. The first fluid injection treatment is applied to the subterranean formation at the first fluid injection location through the well bore. The well bore includes a horizontal well bore. The horizontal well bore includes the first fluid injection location and the second fluid injection location. The second fluid injection location is horizontally offset from the first fluid injection location. The microseismic event data represent microseismic events in a first portion of the subterranean formation, and the second fracture treatment is applied to a second portion of the subterranean formation. Applying the injection treatment includes injecting treatment fluid into the subterranean formation at an injection pressure less than a fracture initiation pressure for the subterranean formation, at an injection pressure greater than or equal to a fracture initiation pressure for the subterranean formation, at an injection pressure less than a fracture closure pressure for the subterranean formation, and/or at an injection pressure greater than or equal to a fracture closure pressure for the subterranean formation. Applying the injection treatment initiates a fracture in the subterranean formation. Applying the injection treatment dilates a natural fracture in the subterranean formation. The injection treatment includes a pad phase of a fracture treatment and/or a proppant-laden phase of a fracture treatment. Designing the injection treatment includes generating a natural fracture model for the subterranean region based on the updated distribution. Designing the injection treatment includes selecting an injection treatment plan based on the natural fracture model.

DESCRIPTION OF DRAWINGS

FIG. 1D is a diagram of an example well system.

Like reference symbols in the various drawings indicate like elements.

DETAILED DESCRIPTION

Figure 1A:
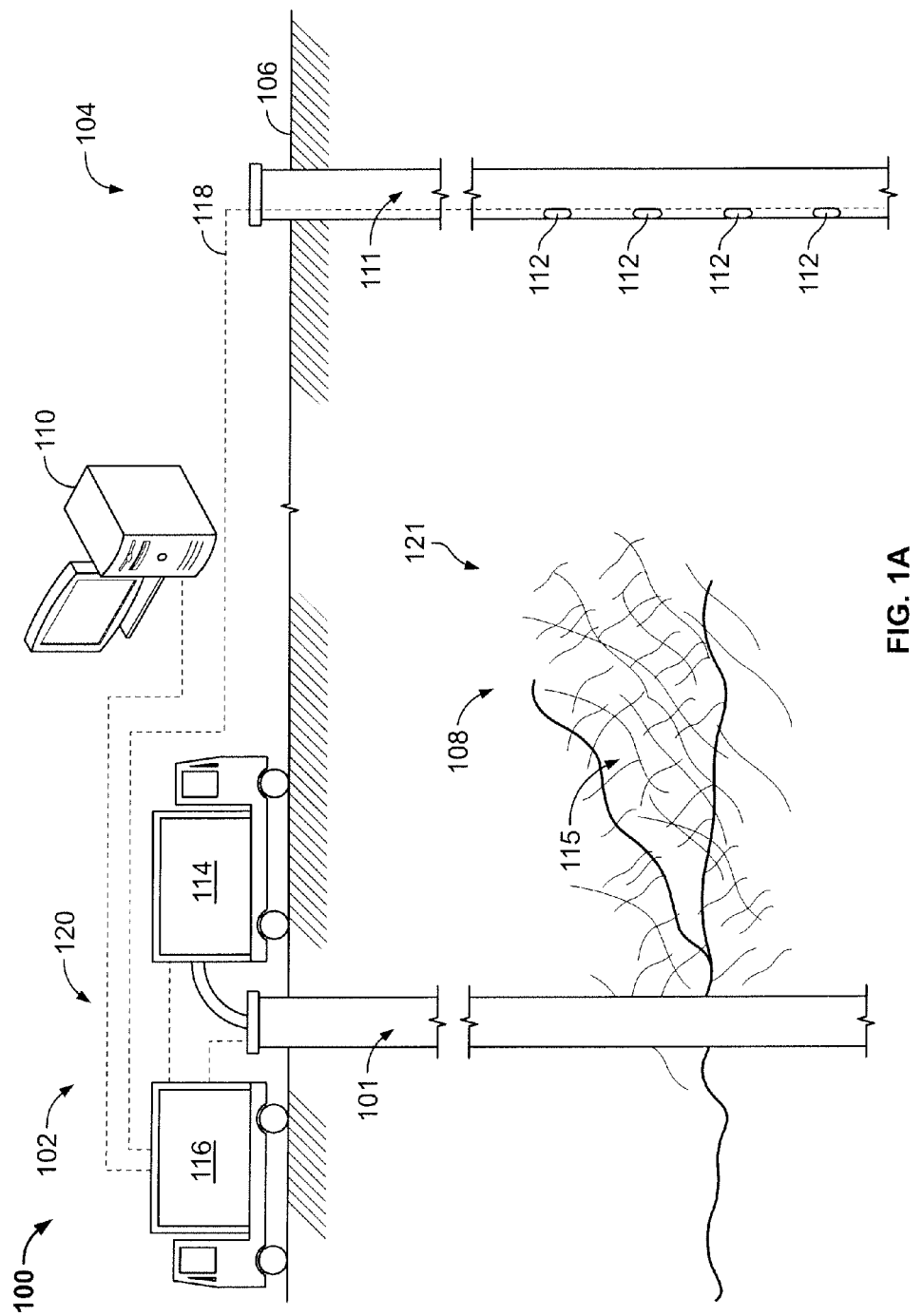
FIG. 1A is a diagram of an example well system.

FIG. 1A is diagram of an example well system 100. The example well system 100 includes a treatment well 102 and an observation well 104. The observation well 104 can be located remotely from the treatment well 102. The well system 100 can include one or more additional treatment wells and/or one or more additional observation wells. The well system 100 can include a computing subsystem 110, which may include one or more computing devices located at one or more well sites and/or at one or more remote locations. The computing subsystem 110 may analyze microseismic data, seismic data, fracture data, and/or other types of data collected from a subterranean region. The computing subsystem 110 may predict and/or simulate fractures and fracture networks in a subterranean formation. The predicted and/or simulated fractures may include natural fracture patterns, propagated and/or complex fracture networks, and others. The computing subsystem 110 may simulate an injection treatment and/or resource production for a subterranean formation. In some implementations, the computing subsystem 110 simulates behavior of finite-dimensional, discontinuous, inhomogeneous, anisotropic, non-elastic (DIANE) rock formations during an injection treatment.

The example treatment well 102 includes a well bore 101 beneath the surface 106, in a subterranean region 121. The region 121 may include a natural fracture network 108 that extends through one or more subterranean formations in the region 121. The natural fracture network 108 may define multiple rock blocks 115 in one or more rock formations. The rock blocks 115 can range in size from centimeters, or smaller, in size to hundreds of meters, or larger, in size. The example treatment well 102 includes an injection treatment subsystem 120, which includes instrument trucks 116, pump trucks 114, and other equipment that may be used to control an injection treatment applied to the subterranean formation through the well bore 101. In some implementations, the treatment well 102 is used to apply an injection treatment to and/or extract resources from the subterranean formation through the well bore 101.

Properties of the injection treatment can be calculated and/or selected based on computer simulations of complex fracture propagation in the subterranean region 121. For example, the computing subsystem 110 can include a fracture simulation system that predicts the behavior of discrete rock blocks 115 in the subterranean region 121 by simulating forces applied to each individual rock block. The simulations may represent the boundaries and/or locations of the rock blocks using a subterranean formation model defined in memory. The subterranean formation model may include a geometric model the represents the boundaries of the rock blocks; the subterranean formation model may include additional information regarding the subterranean formation. The simulations can include probabilistic simulations that generate a range of output subterranean formation models based on multiple input subterranean formation models. Each subterranean formation input model can be generated by randomly sampling a probabilistic earth model that describes the subterranean region. In some implementations, the probabilistic earth model and/or probability distributions included in the earth model are developed or refined based on microseismic data.

As shown in FIG. 1A, the observation well 104 includes a well bore 111 in a subterranean region beneath the surface 106. The observation well 104 includes sensors 112 and other equipment that can be used to sense microseismic information. The sensors 112 may include geophones and/or other types of listening equipment. The sensors 112 can be located at a variety of positions in the well system 100. In FIG. 1A, the example sensors are installed beneath the surface 106 in the well bore 111. In some implementations, sensors may additionally or alternatively be positioned in other locations above or below the surface 106; in other locations within the well bore 111 and/or within another well bore, and/or in other locations in the well system 100. The observation well 104 may include additional equipment (e.g., working string, packers, casing, and/or other equipment) not shown in FIG. 1A. In some implementations, microseismic data is detected by sensors installed in the treatment well 102 and/or at the surface 106, without use of an observation well.

Microseismic information detected at the well bore 111 can include acoustic signals generated by an injection treatment applied through the treatment well 102 or another treatment well (not shown), acoustic signals generated by drilling and/or production activities at the treatment well 102 or another well, acoustic signals generated by naturally-occurring microseisms in the fracture network 108 and/or another fracture network (not shown), and/or other acoustic signals. The microseismic data can include information on the locations of rock slips, rock movements, rock fractures and/or other events in the well system 100.

The microseismic data can be used to refine or improve knowledge of the fracture network 108 and/or another fracture network. For example, microseismic data based on microseismic events in a first formation, region, or zone can be used to infer properties of a different formation, region, or zone. In some cases, the fracture simulation system uses the microseismic data to refine and/or improve a priori knowledge of a fracture network. The refined and/or improved knowledge can then be incorporated into a probabilistic earth model for simulating complex fracture propagation. The simulations can be used to design an injection treatment applied to a subterranean region. For example, the simulations can be used to calculate, refine, optimize, improve, or otherwise select parameters, setting, and/or conditions of an injection treatment applied to the subterranean formation through the treatment well 102.

In some implementations, the computing subsystem 110 can use a discontinuum model to simulate complex fracture propagation. In some instances of a discontinuum model, subterranean formations, including sandstones, carbonates, shales, coals, mudstones, granites, and other materials, can be modeled as a collection of discrete rock blocks separated by fractures, fissures, faults, and/or joints. In some cases, simulations are improved by modeling the rock as a collection of discrete elements and by simulating forces applied to each individual rock block. In some simulations, each rock block can translate, rotate, and/or fracture, for example, as a result of the simulated forces acting on the rock blocks. The simulated forces may include, for example, forces caused by motion of the rock blocks, normal and shear forces due to contact between rock blocks, forces caused by fluid flow between rock blocks, pressure of resident fluids in the rock blocks, and/or other forces. The discontinuum model can be used to simulate fracture dilation, fracture propagation, tensile fractures, open fractures formed by shear displacements along rock-block boundaries, and/or other types of phenomena.

Figure 4A:
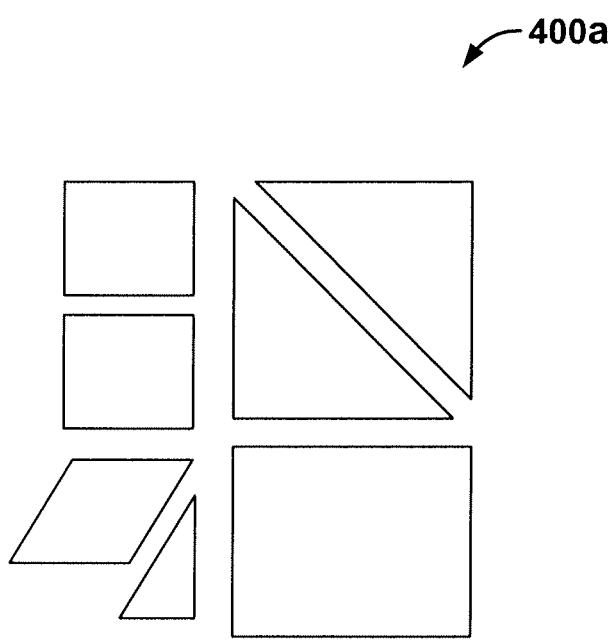
FIG. 4A is a diagram of an example model of discrete rock blocks of a subterranean formation.

An example discontinuum model technique that can be used to simulate complex fracture propagation in a subterranean formation is the discontinuous deformation analysis (DDA) technique and variations thereof. According to the DDA technique, tensile fracture propagation can be modeled along with open fractures resulting from shear displacement of the rock blocks. DDA does not require symmetry of the rock blocks or symmetrical fracture propagation. That is to say, in some implementations, any fracture pattern can be set into the formation, and fracture growth and/or complex fracture propagation can form fracture patterns that are asymmetrical about any point, plane, or axis in the formation. For example, FIG. 4A shows a model of a simple rock formation 400a that includes seven discrete rock blocks separated by fractures that are asymmetrical. Another example discontinuum model technique that can be applied to modeling complex fracture propagation in a subterranean formation is the numerical manifold method (NMM) and variations thereof. In some implementations, an NMM technique couples features of a discontinuum discrete element method with features of a continuum analysis.

In some implementations, the discontinuum model can achieve one or more advantages. For example, the discontinuum model can simulate multiple-fracture propagation, including multiple asymmetric fractures, hydraulic fractures, and others. Such simulations can simulate asymmetric complex fracture patterns and multiple asymmetric planar fractures propagating from multiple entry points along a well bore (e.g., a vertical well bore, a horizontal well bore, and/or a well bore having deviations at any angle). The discontinuum model can simulate dilating complex fracture networks, opening and closing of fractures caused by shear displacement of rock blocks along cleavage planes, and/or other effects. In addition, in various implementations, the discontinuum model can simulate fracture propagation in formations having anisotropic rock properties; the discontinuum model can simulate changes in a stress field resulting from pore pressure depletion and fracturing; the discontinuum model can simulate fracture reorientation in response to changes in the stress field or fracturing conditions; and/or the discontinuum model can predict residual fracture width created by shear offset of rock blocks. The discontinuum model can simulate initiation and propagation of fractures in multiple directions and/or orientations from a single injection location. For example, the discontinuum model can simulate initiation and growth of a two fractures in two different directions from a single injection location, and the two fractures may initiate and grow in planes separated by an arbitrary angle (e.g., any angle between zero and 360 degrees, and/or in another range of directions). The directions of the fractures may be influenced by primary and secondary fracture orientations in the formation.

In some implementations, the computing subsystem 110 can perform a probabilistic simulation of complex fracture propagation in the subterranean formation. The complex fracture network that hydraulic fracturing could dilate, propagate, and/or connect typically depends on the well location and the connectivity of the initial fracture network. In some implementations, probabilistic techniques simulate fracture propagation in multiple different initial fracture network models to generate a range of possible outputs. For example, initial fracture network models can be generated by randomly sampling probability distributions of fracture parameters. Complex fracture propagation can be simulated in each of the initial fracture network models to generate multiple different output fracture models. The simulations can model the subterranean formation as a collection of rock blocks, and predict complex fractures generated by forces applied to the rock blocks. In contrast to a deterministic technique that predicts a single outcome, a probabilistic technique can account for uncertainty in formation properties by generating a range of possible outcomes based on a range of possible formation properties. The range of outcomes can, in turn, be used to generate output probability distributions that describe predicted properties of a complex fracture network and/or other information.

Monte Carlo simulation techniques are an example technique for performing probabilistic numerical simulations. In a typical Monte Carlo simulation, input values of one or more variables are randomly selected by sampling a probability distribution for each variable. In a probabilistic simulation of subterranean complex fracture propagation, the randomly sampled variables may include, for example, fracture dip, fracture direction, fracture persistence, fracture aperture, fracture trace length, fracture spacing, fracture density, stress anisotropy, coefficient of friction between rock blocks, natural fracture roughness, and others. Some or all of these example variables and/or other variables can be described by a probability distribution and randomly sampled. For each set of input values, the Monte Carlo simulation provides a single output, and a range of outputs are obtained based on the multiple sets of input values. The outputs can be used to predict characteristics of complex fracture growth in the subterranean formation modeled by the simulations and/or other types of information.

In some implementations, the computing subsystem 110 can use a probabilistic earth model to populate a geometric model of a subterranean formation, and the geometric model can be used as an input for simulating complex fracture propagation in the subterranean formation. For example, the probabilistic earth model can be used to generate multiple realizations of input geometric models for discontinuum simulations, and the output models from the discontinuum simulations can be analyzed collectively and/or individually.

In many underground petroleum reservoirs, properties of the discrete rock blocks and characteristics of discontinuities are known with some uncertainty. For example, the exact pattern of fractures, faults, fissures, and other features, existing in the reservoir are typically not known with certainty, and probability distributions for the discontinuities can be generated based on data from analog fields, outcrop mapping, open hole logging, microseismic data, and/or other information. The uncertainty may result from imprecise or incomplete knowledge of the rock properties, inhomogeneity of the rock properties, and/or other sources of uncertainty. Uncertainty in the properties of the rock blocks and characteristics of the discontinuities can be accounted for in numerical simulations of the fracture network by defining a probabilistic earth model. The probabilistic earth model, which includes probability distributions that describe ranges of values for each input variable (and a probability for each value), can be used to populate geometric models that serve as an inputs for probabilistic simulations of complex fracture growth.

A probabilistic earth model can describe, among other things, discontinuities in a subterranean region. For example, the discontinuities can include discontinuities at any orientation, including lateral discontinuities that create rock blocks in a single layer, vertical discontinuities that create a multi-layer system of reservoir rocks, fracture sets having a primary orientation, fracture sets having a secondary orientation, and/or others. In some cases, some discontinuities are known with reasonable certainty, for example, major faults can be mapped through a formation with more certainty than some other types of features. In some cases, open hole logging can identify changes in lithology that create vertical discontinuities. In some cases, major faults can be mapped using microseismic data, pressure transient data, and/or other types of data. Properties of other discontinuities, for example, natural fractures or fissures, may not be known with as much certainty as the major faults.

In some implementations, using a probabilistic earth model to populate a geometric model for complex fracture simulation can be used to achieve one or more advantages. For example, a probabilistic earth model may allow for both lateral discontinuities and vertical discontinuities to be included in the geometric model. The lateral discontinuities may represent, for example, lateral and vertical changes in lithology as well as fracture discontinuities, fissures, and faults. A probabilistic earth model may allow complex rock geometries (e.g., lenticular rock geometries, etc.) to be included in the geometric model used for complex fracture simulation. A probabilistic earth model may allow modeling of "stacked" reservoirs, i.e., multiple reservoirs separated vertically by changes in lithology. A probabilistic earth model may describe rock layers that "pinch out" between well bores, which may include rock layers separated by impermeable materials. A probabilistic earth model can be used as an input for Monte Carlo and other types of probabilistic simulation.

In some implementations, the computing subsystem 110 can use microseismic data to refine initial probability distributions describing properties of natural fractures and patterns in the subterranean formation. For example, initial probability distributions can be refined by comparing stochastically generated fracture patterns to observed microseismic events recorded during fracturing, during injection below fracture propagation pressure, during production, and/or at other times. In this manner, fracture modeling, pumping or production operations, and microseismic mapping can be linked to predict fracture patterns in other locations.

Fluid injection, production, and other activities can create microseismic events in a subterranean formation, and microseismic data can be collected from the subterranean formation. The locations of individual microseismic events can be determined based on the microseismic data, and the locations can be matched with numerically simulated fracture patterns. Each numerically simulated fracture pattern can be generated based on a set of fracture parameters, and values for one or more of the parameters may be selected by randomly sampling initial probability distributions for the parameter. Identifying simulated fracture patterns that match the microseismic data allows the initial probability distributions to be refined or corrected for the next location where the process (i.e., the fracture or production process) is to be implemented. The probability distributions may represent variables such as, for example, fracture dip, fracture direction, fracture persistence, fracture dimension, fracture shape, fracture density, fracture aperture, fracture trace length, fracture spacing, and/or others.

In some instances, the initial probability distributions are generic probability distributions for a certain type of formation, material, or region. The generic probability distributions can be refined for a particular geographic area, formation, field, layer, etc. by simulating fracture patterns based on the generic probability distributions and selecting the simulated fracture patterns that match microseismic data from the particular geographic area, formation, field, layer, etc. The refined probability distributions can be subsequently used for other locations in the same geographic area, formation, field, layer, etc. to predict natural fracture patterns. As more microseismic events are recorded and mapped, the probability distributions can be further refined, for example, in an iterative or another fashion.

In some cases the matching technique (i.e., matching microseismic data to simulated fracture patterns) can be done in real-time as events are recorded, or the matching technique can be implemented based on previously recorded microseismic data. After mismatches of microseismic events and simulated fracture patterns are eliminated, the remaining "matched" maps of microseismic events and natural fracture model realizations can be used to regenerate and/or refine the probability distributions. The regenerated or refined probability distributions of natural fracture properties and patterns can then be used to predict natural fracture patterns at other locations.

Figure 1B:
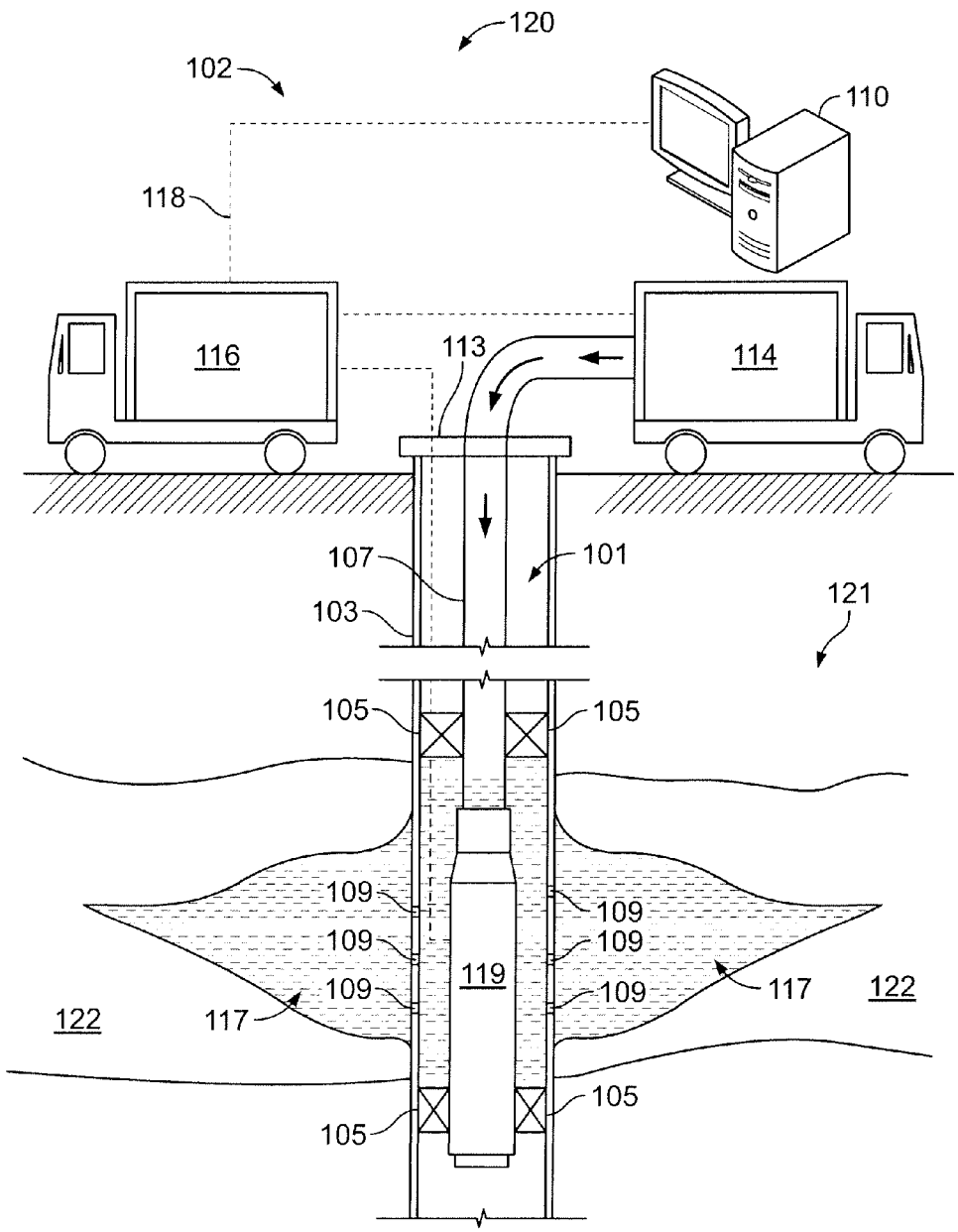
FIG. 1B is a diagram of the example treatment well 102 of FIG. 1A.

FIG. 1B is a diagram showing an example injection treatment applied at the example treatment well 102 of FIG. 1A. As shown in FIG. 1B, the treatment well 102 intersects a subterranean formation 122. In some implementations, the formation 122 includes naturally fractured rock containing oil, gas, and/or other resources. For example, the formation 122 may include fractured sandstone, fractured carbonate materials, fractured shale, fractured coal, fractured mudstone, fractured granite, and/or others fractured material. In some implementations, the treatment well 102 intersects other types of formations, including reservoirs that are not naturally fractured to any significant degree.

As shown in FIG. 1B, an injection treatment can be applied to the subterranean formation 122 through the well bore 101. The injection treatment may include a fracture treatment and/or another type of stimulation treatment. A fracture treatment may include a mini fracture test treatment, a regular or full fracture treatment, a follow-on fracture treatment, a re-fracture treatment, a final fracture treatment and/or another type of fracture treatment. The injection treatment may inject treatment fluid into the formation above, at or below a fracture initiation pressure for the formation, above at or below a fracture closure pressure for the formation, and/or at another fluid pressure. Fracture initiation pressure refers to a minimum fluid injection pressure that can initiate and/or propagate artificial fractures in the subterranean formation. As such, application of an injection treatment may or may not initiate and/or propagate artificial fractures in the formation. Fracture closure pressure refers to a minimum fluid injection pressure that can dilate existing fractures in the subterranean formation. As such, application of an injection treatment may or may not dilate natural and/or artificial fractures in the formation.

The injection treatment and/or properties of the injection treatment may be calculated, improved, optimized, and/or otherwise selected based on simulations (e.g., computer-implemented simulations) of complex fracture propagation in the formation 122 or another formation. For example, the injection treatment may include a flow rate, a flow volume, a slurry concentration, and/or other characteristics that have been selected based on numerical simulations of a injection treatment applied to the formation 122. A simulated complex fracture network may be used to predict a volume, rate, and/or location of resource production from the formation 122.

The example treatment well 102 shown in FIG. 1B includes the well bore 101, a casing 103 and well head 113. The well bore 101 shown in FIG. 1B includes a vertical well bore. More generally, a treatment well may additionally or alternatively include one or more slant well bores, one or more horizontal well bores, one or more deviated well bores, and/or other types of well bores. The casing 103 may be cemented or otherwise secured in the well bore 101. Perforations 109 may be formed in the casing 103 in the formation 122 to allow treatment fluids, proppants, and/or other materials to flow into the formation 122, and/or to allow oil, gas, by-products, and other materials to flow into the treatment well 102 and be produced to the surface 106. Perforations 109 may be formed using shape charges, a perforating gun, and/or other tools.

As shown in FIG. 1B, a working string 107 is disposed in the well bore 101. The working string 107 may include coiled tubing, sectioned pipe, and/or other types of tubing and/or pipe. As shown in FIG. 1B, a fracturing tool 119 is coupled to the working string 107. The fracturing tool 119 can include a hydrajetting/fracturing tool and/or another type of fracturing tool. Example hydrajetting/fracturing tools include the SURGIFRAC tool (manufactured by HALLIBURTON), the COBRA FRAC tool (manufactured by HALLIBURTON), and others. The packers 105 shown in FIG. 1B seal the annulus of the well bore 101 above and below the formation 122. Packers 105 may include mechanical packers, fluid inflatable packers, sand packers, and/or other types of packers.

As shown in FIG. 1B, the pump trucks 114 are coupled to the working string 107 at the surface 106. The pump trucks 114 may include mobile vehicles, immobile installations, skids, hoses, tubes, fluid tanks or reservoirs, pumps, valves, and/or other suitable structures and equipment. During operation, the pump trucks 114 pump fluid 117 to the fracturing tool 119, which performs the injection treatment by injecting the fluid 117 into the formation 122. The fluid 117 may include a pad, proppants, a flush fluid, additives, and/or other materials. For example, a injection treatment may include a pad phase, where a pad (which typically includes fluids without proppants), is pumped down the well bore and injected into the surrounding the formation to induce fracture. After the pad phase, the injection treatment may include a subsequent proppant phase, where fracturing fluids containing proppants are pumped into the formation. The injected proppants may hold the fractures open to stimulate production from the formation. After the proppant phase, a clear fluid flush may be pumped into the well bore to clean the well bore of proppants and/or other materials.

As shown in FIG. 1B, the instrument trucks 116 are also provided at the surface 106. The instrument trucks 116 may include mobile vehicles, immobile installations, and/or other suitable structures. The instrument trucks 116 may include a technical command center. The example instrument trucks 116 include a injection control system that monitors and controls the injection treatment. The injection control system may control the pump trucks 114, fracturing tool 119, fluid valves, and/or other equipment used to apply the injection treatment and/or a perforating treatment. The treatment well 102 may also include surface and down-hole sensors (not shown) to measure pressure, rate, temperature and/or other parameters of treatment and/or production. The treatment well 102 may include pump controls and/or other types of controls for starting, stopping and/or otherwise controlling pumping as well as controls for selecting and/or otherwise controlling fluids pumped during the injection treatment. The injection control system in the instrument trucks 116 can communicate with the surface and/or subsurface sensor, instruments, and other equipment to monitor and control the injection treatment.

The example instrument trucks 116 shown in FIG. 1B communicate with the pump truck 114, the surface and subsurface instruments, the computing subsystem 110, and/or other systems and subsystems through one or more communication links 118. All or part of the computing system 110 may be contained in the instrument trucks 116; all or part of the computing system 110 may be contained outside of the instrument trucks at a well site and/or at a remote location. In an example embodiment, the computing subsystem 110 is contained in a technical command center at the well site. In another example embodiment, the computing subsystem 110 is contained in a real-time operations center at a remote location, and the computing subsystem 110 communicates by satellite with a injection control system at the well site. In some embodiments, the computing subsystem 110, the listening subsystem (which includes the sensors 112), and other subsystems at one or more well sites communicate with a remote real-time operations center by wide area network.

The communication links 118 can include multiple uncoupled communication links and/or a network of coupled communication links. The communication links 118 may include wired and/or wireless communications systems. For example, surface sensors and pump controls may communicate with the injection control system through a wired or wireless link, down-hole sensors may communicate to a receiver at the surface through a wired or wireless link, and the receiver may be coupled by a wired or wireless link to the injection control system. As another example, the instrument truck 116 may communicate with the pump trucks 114 and/or the computing subsystem 110 via wired and/or wireless digital data communication networks, wired and/or wireless analog communication links, and/or other types of communication links.

The injection control system and/or other components of the instrument trucks 116 can communicate with the computing subsystem 110 to receive injection treatment parameters and/or other information. The computing subsystem 110 may include a fracture simulation system that calculates, selects, and/or optimizes injection treatment parameters for treatment of the formation 122 or another formation. The example fracture simulation system implemented by the computing subsystem 110 in FIG. 1B can simulate the injection treatment during a design phase of the injection treatment. The fracture simulation system can use data collected during a injection treatment to simulate further injection treatments in the formation 122 and/or other formations. The fracture simulation system can be updated during and after a injection treatment based on measured and/or observed data, including fracture, subsequent production and/or other data.

In one aspect of operation, the fracturing tool 119 is coupled to the working string 107 and positioned in the treatment well 102. The packers 105 are set to isolate the formation 122. The pump trucks 114 pump fluid 117 down the working string 107 to the fracturing tool 119. The fluid 117 exits the fracturing tool 119 and fractures the formation 122. In some implementations, the fluid may include a fluid pad pumped down the treatment well 102 until breakdown of the formation 122, and proppants may then be pumped into the fractures, followed by a fluid flush. In some implementations, the injection treatment is performed in a different manner.

Some embodiments and/or some aspects of the techniques and operations described herein may be implemented by a computing subsystem configured to provide the functionality described. In various embodiments, a computing device may include any of various types of devices, including, but not limited to, a personal computer system, desktop computer, laptop, notebook, mainframe computer system, handheld computer, workstation, network computer, application server, storage device, or any type of computing or electronic device.

Figure 1C:
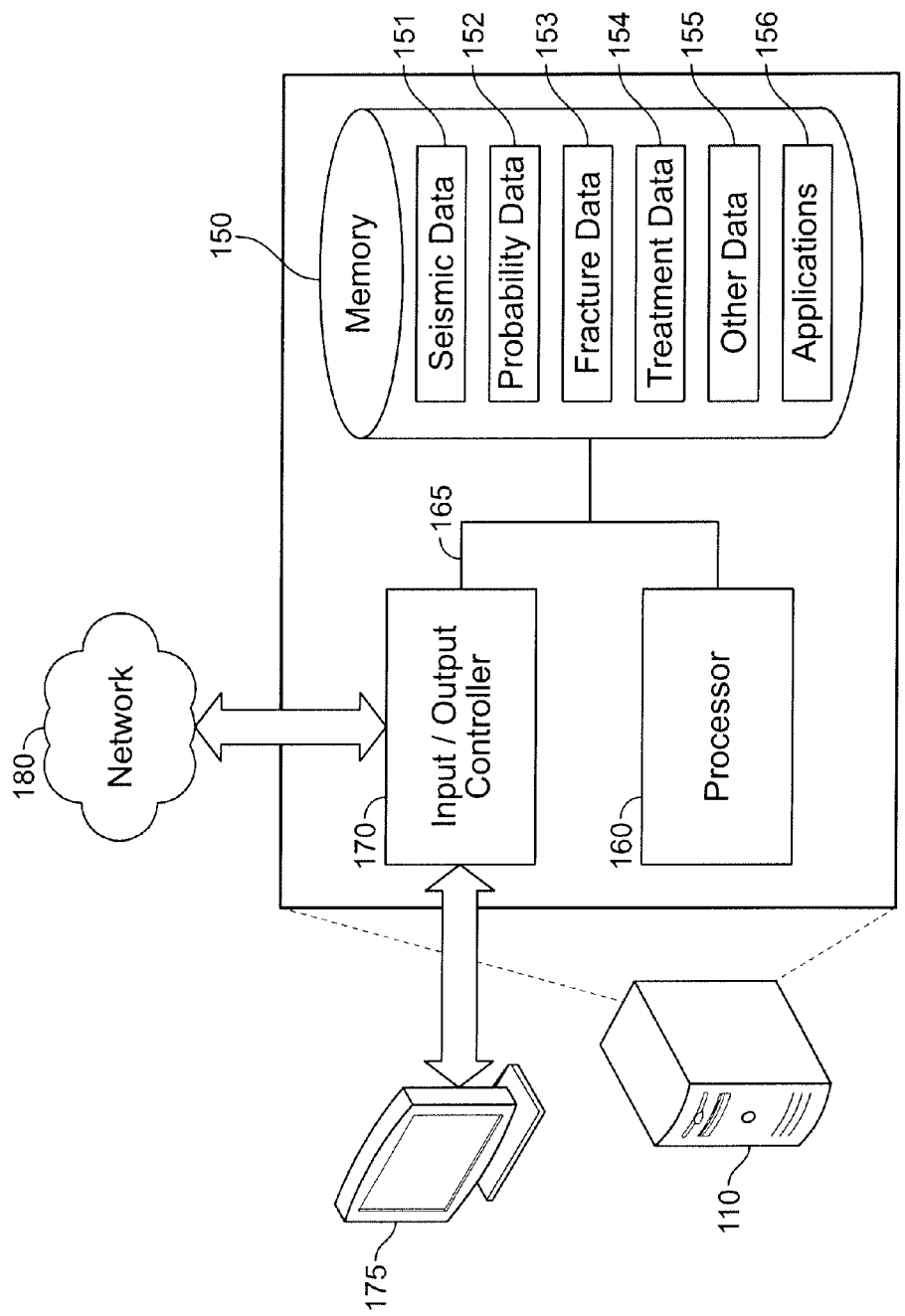
FIG. 1C is a diagram of the example computing device 110 of FIG. 1A.

FIG. 1C is a diagram of the example computing subsystem 110 of FIG. 1A. The example computing subsystem 110 can be located at or near one or more wells of the well system 100 and/or at a remote location. The example computing subsystem 110 includes a processor 160, a memory 150, and input/output controllers 170 communicably coupled by a bus 165. The memory can include, for example, a random access memory (RAM), a storage device (e.g., a writable read-only memory (ROM) and/or others), a hard disk, and/or another type of storage medium. The computing subsystem 110 can be preprogrammed and/or it can be programmed (and reprogrammed) by loading a program from another source (e.g., from a CD-ROM, from another computer device through a data network, and/or in another manner). The input/output controller 170 is coupled to input/output devices (e.g., a monitor 175, a mouse, a keyboard, and/or other input/output devices) and to a network 180. The input/output devices receive and transmit data in analog or digital form over communication links such as a serial link, wireless link (e.g., infrared, radio frequency, and/or others), parallel link, and/or another type of link.

The network 180 can include any type of data communication network. For example, the network 180 can include a wireless and/or a wired network, a Local Area Network (LAN), a Wide Area Network (WAN), a private network, a public network (such as the Internet), a WiFi network, a network that includes a satellite link, and/or another type of data communication network. The network 180 can include some or all of the communication link 118 of FIG. 1A.

The memory 150 can store instructions (e.g., computer code) associated with an operating system, computer applications, and/or other resources. The memory 150 can also store application data and data objects that can be interpreted by one or more applications and/or virtual machines running on the computing subsystem 110. As shown in FIG. 1C, the example memory 150 includes microseismic data 151, probability data 152, fracture data 153, treatment data 154, other data 155, and applications 156. In some implementations, a memory of a computing device may include some or all of the information stored in the memory 150.

The microseismic data 151 can include information on the locations of microseisms in a subterranean formation. For example, the microseismic data can include information based on acoustic data detected at the observation well 104, at the surface 106, at the treatment well 102, and/or at another location. The microseismic data 151 can be matched to simulated fracture patterns in order to refine an initial distribution of fracture properties. For example, a map of the locations of the microseismic events can be compared to a map of a simulated fracture pattern to identify whether the simulated fracture pattern accurately represents the measured microseismic data. Example microseismic data is represented in the graphical user interface in FIG. 5.

Figure 3A:
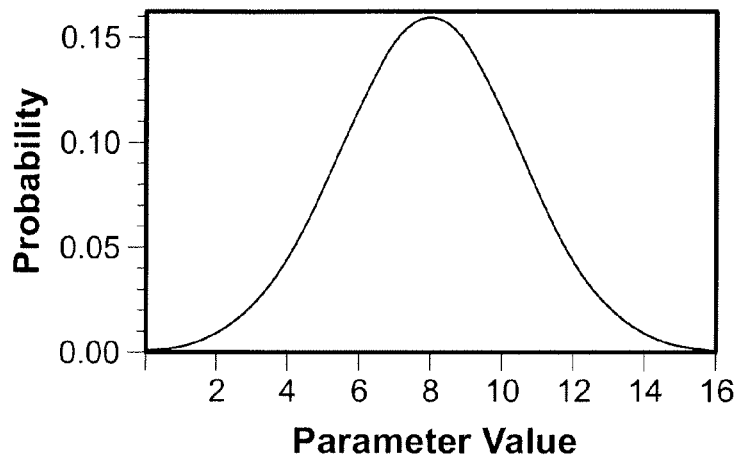
FIG. 3A shows an example population distribution for an example fracture parameter.
Figure 3B:
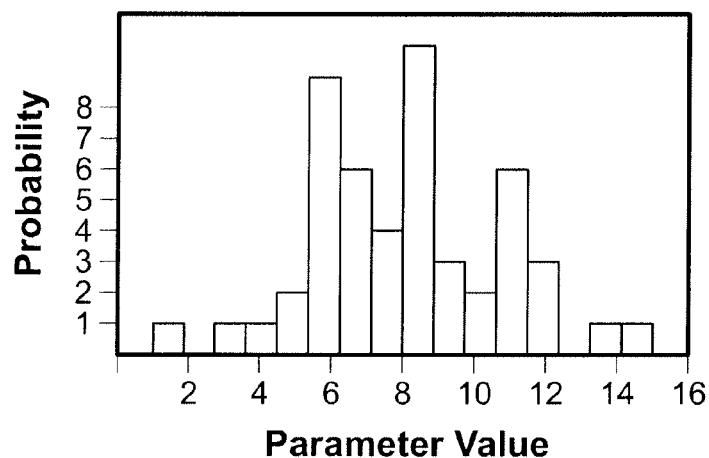
FIG. 3B shows an example initial sample distribution for an example fracture parameter.
Figure 3C:
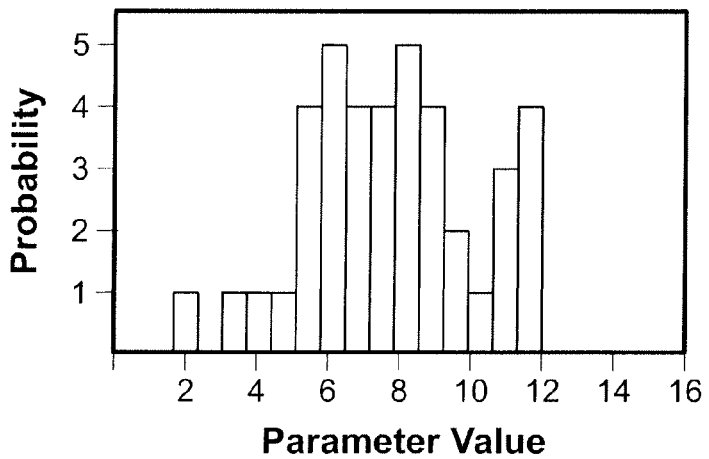
FIG. 3C shows an example refined population distribution for an example fracture parameter.

The probability data 152 can include probability distributions for parameters used in numerical simulations of fracture patterns and complex fracture propagation in a subterranean formation. The probability data 152 may be included in a probabilistic earth model. A probability distribution for a given parameter typically includes one or more possible values (or one or more possible ranges of values) for the given parameter and the likelihood of occurrence for each possible value (or each possible range of values). The probability data 152 can include generic probability distributions for a certain type of formation, material, or region. An example generic probability distribution is shown in FIG. 3A and discussed below. The probability data 152 can include initial sample probability distributions for a particular formation, material, or region. An example initial sample probability distribution is shown in FIG. 3B and discussed below. The probability data 152 can include refined probability distributions that have been modified to represent a particular geographic area, formation, field, layer, etc., for example, by matching microseismic data from the particular geographic area, formation, field, layer, etc. with simulated fracture patterns. An example refined probability distribution is shown in FIG. 3C and discussed below. The probability data 152 can include output probability distributions representing the output of a probabilistic simulation of complex fracture propagation in a subterranean formation. For example, the output probability distribution may be based on complex fracture simulation for multiple different initial geometric models.

The fracture data 153 can include information on fractures, fracture patterns and complex fracture network generated by numerical simulations. The fracture data 153 may identify the locations, sizes, shapes, and other properties of fractures in a model of a subterranean formation. In some implementations, the fracture data 153 is represented in a geometric model or another type of construct. For example, a geometric model may represent a subterranean formation as a collection of rock blocks, and the fractures may be defined with respect to the rock blocks. Example fracture data is represented by the natural fracture patterns shown in FIGS. 2A, 2B, and 2C. Example fracture data is also represented by the geometric models in FIGS. 4A, 4B, and 4C.

The treatment data 154 includes information on injection treatments. For example the treatment data 154 can indicate parameters of a previous injection treatment, parameters of a future injection treatment, and/or parameters of a proposed injection treatment. Such parameters may include information on flow rates, flow volumes, slurry concentrations, fluid compositions, injection locations, injection times, and/or other parameters. The treatment data 154 can include treatment parameters that have been optimized and/or selected based on numerical simulations of complex fracture propagation.

The applications 156 can include software applications, scripts, programs, functions, executables, and/or other modules that are interpreted and/or executed by the processor 160. For example, the applications 156 can include software applications, scripts, programs, functions, executables, and/or other modules that operate alone or in combination as a fracture simulation system. Such applications may include machine-readable instructions for performing one or more of the operations shown in FIGS. 6A and 6B. The applications 156, including the fracture simulation system, can obtain input data, such as probability distributions, microseismic data, treatment data, geometric models, and/or other types of input data, from the memory 150, from another local source, and/or from one or more remote sources (e.g., via the network 180). The applications 156, including the fracture simulation system, can generate output data and store the output data in the memory 150, in another local medium, and/or in one or more remote devices (e.g., by sending the output data via the network 180).

The processor 160 can execute instructions, for example, to generate output data based on data inputs. For example, the processor 160 can run the applications 156 by executing and/or interpreting the software, scripts, programs, functions, executables, and/or other modules contained in the applications 156. The processor 160 may perform one or more of the operations shown in FIGS. 6A and 6B. The input data received by the processor 160 and/or the output data generated by the processor 160 may include any of the microseismic data 151, the probability data 152, the fracture data 153, the treatment data 154, and/or the other data 155.

The systems and techniques described with reference to FIGS. 1A, 1B, and 1C may be implemented in other types of well systems, using other types of equipment and apparatus, as appropriate. For example, FIG. 1D shows features of an example embodiment of a well system 190 that includes a treatment well 191 having multiple fluid injection locations in a subterranean region 193 beneath the surface 189. The subterranean region 193 includes a fracture network 194 that defines the boundaries and discontinuities of rock blocks 195 in a subterranean formation. The example treatment well 191 includes a horizontal well bore 192 having three fluid injection locations 196a, 196b, and 196c in the fracture network 194. Any number of fluid injection locations may be used. For example, a well system may include two, five, tens, hundreds, or any other number of fluid injection locations. Multiple fluid injection locations may also be implemented in other types of well bores and/or other types of well systems, such as, for example, vertical well bores, slant well bores, and/or others.

The treatment well 191 includes an injection treatment subsystem 197 that applies injection treatments to the subterranean formation. The injection treatment subsystem 197 includes instrument trucks 116, pump trucks 114, and other features that control the communication of treatment fluid into the subterranean region 193 through the well bore 192. The injection treatment subsystem 197 may include any of the features of the injection treatment subsystem 120 of FIGS. 1A and 1B, and may include fewer, additional, and/or different features. The injection treatment subsystem 197 may apply multiple injection treatments in succession. For example, the injection treatment subsystem may treat the subterranean formation in sequence from the toe to the heel of the horizontal well bore 192, and/or in a different sequence in order to improve or optimize the injection treatment. As a particular example, the injection treatment subsystem 197 may apply a first injection treatment to the formation through the well bore 192 at the first injection location 196*a*, then apply a second injection treatment to the formation through the well bore 192 at the second injection location 196*b*, and then apply a third injection treatment to the formation through the well bore 192 at the third injection location 196*c*. The injection treatment subsystem 197 may apply additional injection treatments in additional and/or different locations in the same or a different order. For example, in some cases, multiple injection treatments can be applied simultaneously.

The well system 190 includes sensors 112 at the surface 189. The sensors 112 may detect microseismic data during one or more injection treatments applied to the subterranean region 193 through the well bore 192. The sensors 112 may communicate detected microseismic data to the computing subsystem 110. The computing subsystem 110 can use the microseismic data, for example, to identify and/or predict properties of natural fractures and/or propagated fractures in the fracture network 194. The computing subsystem 110 can simulate, refine, generate, and/or design injection treatments for the subterranean region 193 based on the microseismic data and/or based on the properties of the fracture network 194 gleaned from the microseismic data. For example, the computing subsystem 110 may receive microseismic data collected by the sensors 112 during a fracture treatment applied at the first injection location 196*a*, and the computing subsystem 110 may use the microseismic data to identify properties of natural fractures near the first injection location 196*a* and/or to predict properties of natural fractures near the second injection location 196*b* and/or the third injection location 196*c*.

In one aspect of operation, the computing subsystem 110 can generate fracture pattern models based on an initial distribution for a fracture parameter. Each fracture pattern model can include estimated and/or simulated locations of natural fractures of the fracture network 194. The computing subsystem 110 can refine the initial distribution and/or generate an updated distribution for the natural fracture parameter based on comparing each fracture pattern model to microseismic event data for the subterranean region 193. The microseismic data may include data collected from a first volume of the formation during a prior fracture treatment that was previously applied to the subterranean formation at one or more first injection locations in the first volume (e.g., the injection location 196*a* and/or another location). A subsequent injection treatment can be designed based on the updated distribution, and the subsequent injection treatment can be applied to the subterranean formation through the well bore 192. In some implementations, the subsequent injection treatment, which is designed based on the updated distribution, is applied to a second volume of the formation at one or more second injection locations (e.g., the injection location 196*b* and/or another location). Microseismic data may be collected during application of the subsequent injection treatment, and used to predict fracture parameters for a third volume of the formation. In some cases, the technique of sequentially collecting microseismic data from a volume of a formation, using the microseismic data to predict fracture parameters for another volume of the formation, and then designing and applying a fracture treatment to the other volume of the formation based on the predicted parameters can be repeated in sequence along the length of a well bore.

Some embodiments of a well system may be implemented with additional and/or different variations. For example, in some cases, a well system can be implemented without an observation well or with more than one observation well. As another example, in some cases, a well system can be implemented with more than one production and/or treatment wells. As another example, all or part of a computing subsystem can be integrated with other features of a well system, all or part of a computing subsystem can be implemented as a standalone system, and/or all or part of a computing subsystem can be used in connection with multiple well systems.

Figure 2A:
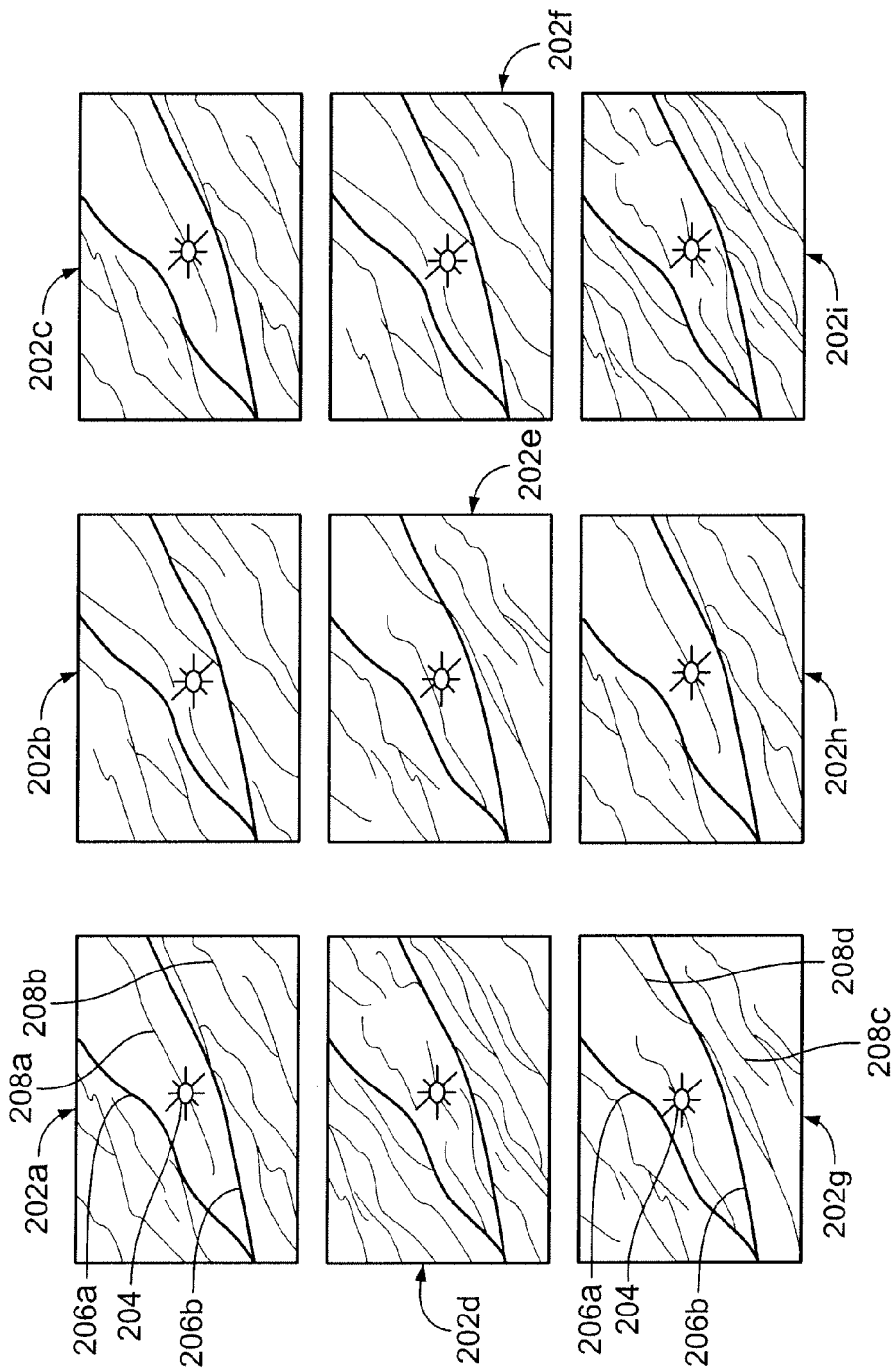
FIG. 2A is a plot of nine example fracture patterns.
Figure 2B:
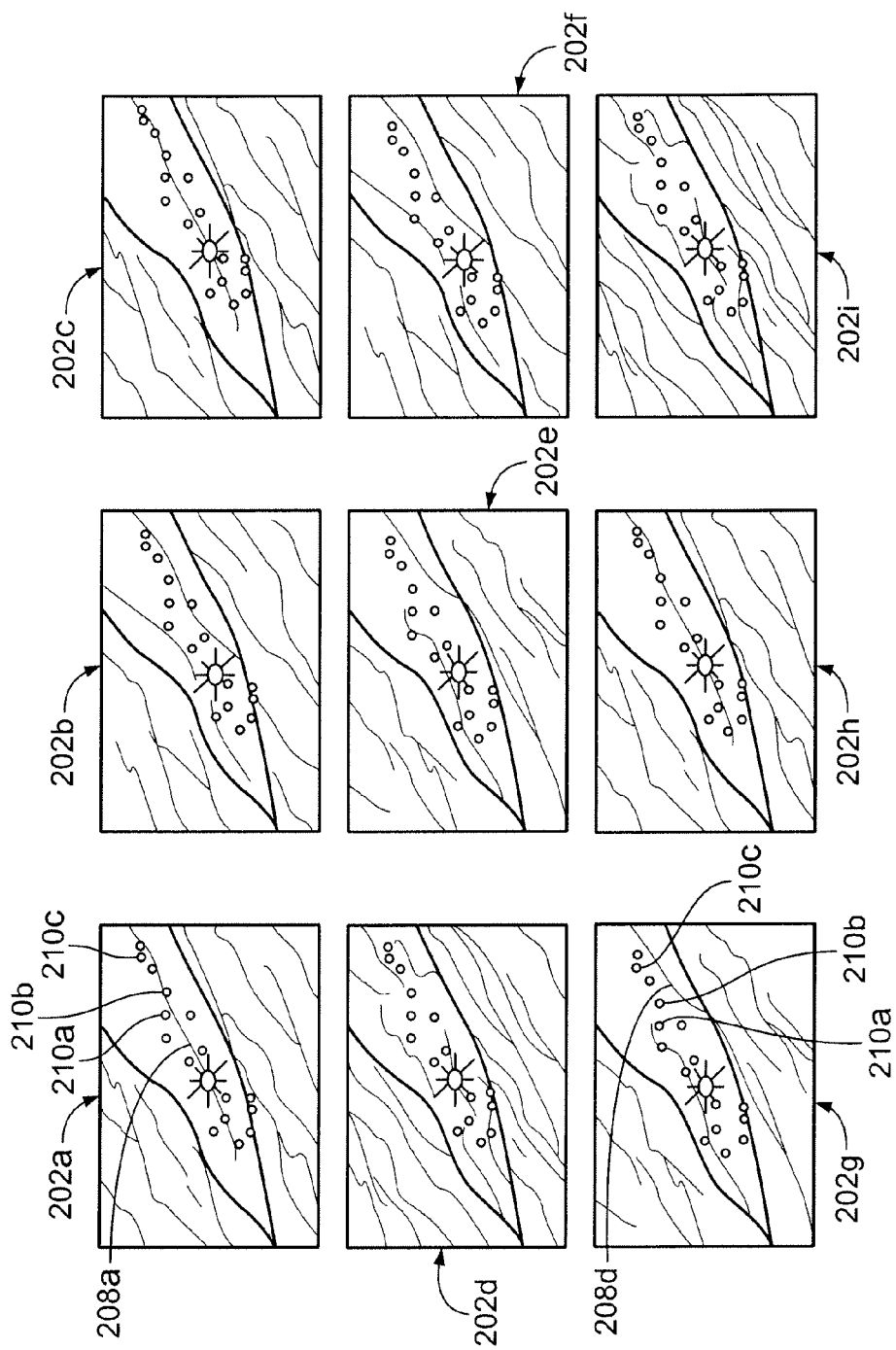
FIGS. 2B and 2C are plots of the nine example fracture patterns of FIG. 2A, with microseismic data overlaid on each fracture pattern.
Figure 2C:
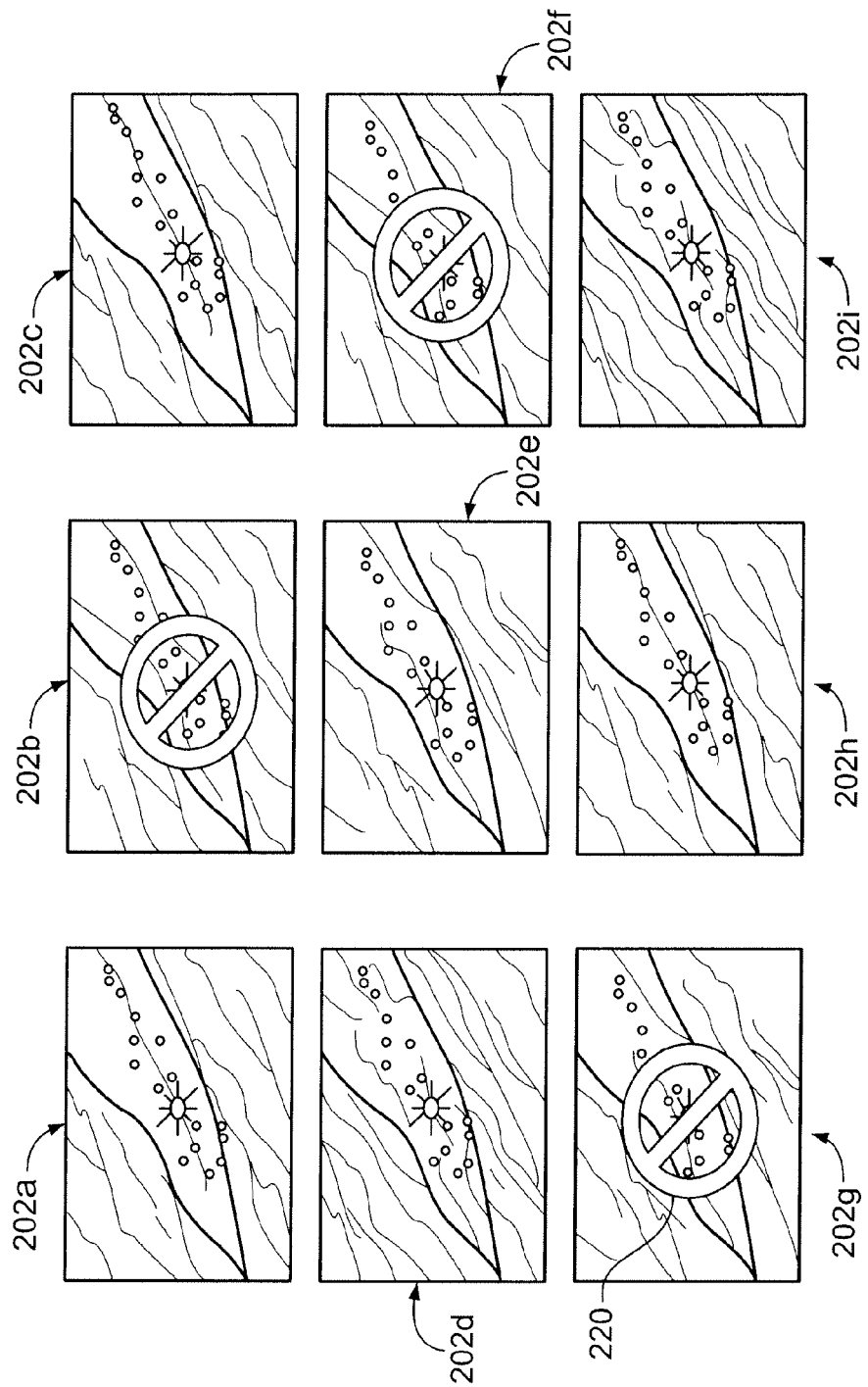

FIGS. 2A, 2B, and 2C collectively show an example of matching computer simulated fracture patterns with microseismic data. The matching, which involves selecting or identifying fracture patterns that accurately approximate the locations of the microseismic data, can be used to refine probability distributions used to generate the simulated fracture patterns. As such, a generic or initial probability distribution can be refined, in some cases by an iterative process, to more accurately reflect the actual distribution of natural fracture parameters in a particular geographic area, location, region, formation, or zone.

FIG. 2A is a plot of nine example fracture pattern realizations 202*a*, 202*b*, 202*c*, 202*d*, 202*e*, 202*f*, 202*g*, 202*h*, and 202*i*, each generated based on initial probability distributions of fracture parameters. The initial probability distributions can include initial sample distributions generated based on well logs, outcrop data, and/or other types of data. The initial probability distributions may be generated, for example, based on the techniques shown and described with respect to FIGS. 7A, 7B, and/or 7C. The initial probability distribution can include generic distributions of parameters for a selected type of formation, material, or region. A generic distribution can be defined based on a distribution function. Examples of distribution functions include a normal (or "Gaussian") distribution, a log normal distribution, an exponentially decaying distribution, a Poissonian distribution, and others.

Each of the nine fracture pattern realizations in FIG. 2A contains major fractures 206*a* and 206*b*, represented as bold lines. The major fractures 206*a* and 206*b* are the same in each realization, because the locations of those features are known with a high degree of certainty. As such, the major fractures 206*a* and 206*b* shown in FIG. 2A are not based on a distribution of fracture parameters. The other features (the intermediate features) in each of the nine fracture pattern realizations are based on distributions of fracture parameters because the properties of those features are not known with a high degree of certainty. The intermediate fractures, represented as thin lines in the plots, vary among the nine fracture pattern realizations because the locations (and other properties) of those features are determined by randomly sampling probability distributions. For example, the fractures 208*a* and 208*b* in fracture pattern 202*a* do not appear in the other fracture patterns, and the fractures 208*c* and 208*d* in fracture pattern 202*g* do not appear in the other fracture patterns.

In some embodiments, each realization of the natural fracture network is generated based sampling on values from probability distributions for fracture dip, fracture density, fracture direction, fracture persistence, fracture aperture, fracture trace length, fracture center point location, and/or fracture spacing. The fracture dip can indicate a vertical angle of the fracture with respect to a horizontal orientation (or some other reference orientation). In some implementations, the fracture dip is initially assumed to be $\pi/2$, representing a vertical fracture. In some implementations, the fracture dip is initially assumed to be zero, representing a horizontal fracture. In some implementations, the fracture dip is initially represented by a normal distribution centered about $\pi/2$, a log normal distribution centered about $\pi/2$, or another type of distribution. The fracture direction can indicate an azimuthal direction (e.g., North, South, East, West, and combinations thereof) of the fracture. In some implementations, the fracture direction is initially assumed to be uniformly distributed in all directions, from zero to $2\pi$. In some implementations, the fracture direction is initially assumed to have a single value, indicating that all fractures have the same direction. In some implementations, the fracture direction is initially represented by a normal distribution centered about a particular direction, a log normal distribution centered about a particular direction, or another type of distribution.

The fracture persistence and fracture aperture can indicate the shape and size dimensions of the fracture. In some implementations, the fracture persistence and aperture are initially assumed to be identical for all fractures, meaning that all fractures are assumed to have the same dimension and shape. The assumed shapes can be rectangular, elliptical, triangular, circular, another regular shape, and/or arbitrary shapes. In some implementations, the fractures include fractures ranging in size from fractures that contact one square foot of rock to fractures that contact thousands or millions of square feet of rock, and/or fractures of other sizes. The fracture trace length can indicate the length (or in some cases, the half length) of the fracture. In some implementations, the fracture trace length is initially represented by a normal distribution, a log normal distribution, or another type of distribution.

The fracture density can indicate an average number of fractures per unit volume in a subterranean formation or a portion of a subterranean formation. Subterranean formations may exhibit a broad of fracture densities. For example, a subterranean formation may include an average of ten, one hundred, one thousand, or more fractures per cubic mile of formation. In some implementations, the initial fracture density of a subterranean formation is initially represented by a normal distribution, log normal distribution, or another type of distribution.

The fracture spacing can indicate an average spacing between fractures within a fracture set in a formation. For example, in some formations natural fractures tend to form in sets, where each fracture in a set is oriented within approximately sixty degrees of each other. Some formations include multiple sets of fractures. For example, a formation may include a first set of fractures having a primary orientation, which may be dictated by a maximum stress direction. A formation may also include a second set of fractures having a secondary orientation, which is different from the primary orientation. The secondary orientation may be separated from the primary orientation by more than sixty degrees. For example, the secondary orientation can be normal (orthogonal) to the primary orientation. In some implementations, each set of fractures is initially assumed to have a fracture spacing represented by a log normal distribution, a normal distribution, or another type of distribution.

The fracture patterns shown in FIG. 2A are generated by sampling distributions for fracture density, fracture trace length, and fracture spacing. In some implementations, a graphics processing unit can be used to generate the natural fracture pattern realizations. Each example fracture pattern realization shown in FIG. 2A may represents a plan view of, for example, one square mile, two square miles, ten square miles, or another area of a subterranean formation. The areal extent represented by a model may be a fixed or variable value. In some implementations, the areal extent is input by a user. In some implementations, the areal extent is determined based on the locations of microseismic events, based on a size of a reservoir or formation, based on sampling a distribution, and/or by another technique. For each realization, the center point of each non-major fracture is determined based at least in part on sampling the fracture spacing, and the length of each non-major fracture is determined based at least in part on sampling the fracture trace length distribution. While nine realizations are shown in the example, any number of realizations can be used. In some cases, hundreds or thousands of realizations are used. FIGS. 2A, 2B, and 2C show examples of two-dimensional fracture models. In some implementations, three-dimensional fracture models may be used.

FIG. 2B is a plot of the nine example fracture patterns of FIG. 2A, with a map of microseismic event locations overlaid on each fracture pattern. The map of microseismic events is the same in each realization and overlaid on each fracture pattern in order to compare the microseismic data to each individual fracture pattern. The example microseismic data includes sixteen data points. For example, the data points $210a$, $210b$, and $210c$ labeled in fracture patterns $202a$ and $202g$ are in the same location in all nine fracture patterns shown. While sixteen microseismic data points are shown in FIG. 2B, any number of microseismic data points can be used. In some implementations, hundreds or thousands of microseismic data points are used. In some implementations, the microseismic data points that are plotted with and/or compared to the fracture patterns can include a subset of data points selected from a larger set of microseismic data points. For example, the larger set of microseismic data point can include data points distributed over a range of vertical depths, and the selected data points can include a planar set of data points at (or within a certain range of) a particular depth. As a particular example, the first pane $502$ of the graphical user interface $500$ of FIG. $5$ shows microseismic data points distributed over a range of vertical depths, and the second pane $502$ of the graphical user interface $500$ shows a selected subset of the data points associated with a particular depth in the range.

Each microseismic data point can include information on a location associated with a microseismic event and information on a magnitude associated with the microseismic event. The information on the location of the microseismic event may include spatial coordinates (e.g., latitude, longitude, elevation, depth, etc.) that identify a location in the subterranean formation where acoustic data indicates a microseismic event occurred. Acoustic data gathered from one or more locations can be used to identify the location of the microseismic event, for example by triangulation or another technique. The location and/or the magnitude may be identified based on differences in time of arrival of the detected acoustic signal, absolute or relative magnitudes of the detected acoustic signals, waveform and/or relative phase differences of the detected acoustic signals, and/or other properties of the detected acoustic signals. The location of each microseismic event is indicated in FIG. 2B by the location of a data point on each fracture pattern plot. The magnitude of each microseismic event is not represented in the example plots of FIG. 2B. However, in some implementations, the magnitude of each microseismic event may be represented by a size of the data point, a color of the data point, a shape of the data point, and/or in another manner. Each data point may additionally include information on a time associated with the microseismic event. For example, the time information may identify an absolute or relative time of occurrence of each microseismic event.

Each microseismic data point may additionally include information on an error or uncertainty associated with the measured microseismic event. For example, there may be an error bar associated with the location and/or the magnitude of each microseismic event. In some implementations, the location of a microseismic event includes a range of possible locations representing uncertainty and/or errors in the microseismic data. While error bars are not shown in FIGS. 2B and 2C, a plot or a map of microseismic events may include a graphical representation of error bars for microseismic event data. For example, in some instances, the location for each microseismic data point may be represented as the center of a sphere or an ellipsoid, and the radius of the sphere can represent the uncertainty and/or error associated with the measurement. In two dimensions, each microseismic data point may be analogously represented as the center of a circle or an ellipse. Error and/or uncertainty in the location and/or magnitude may be represented by another type of geometrical shape and/or in a different manner.

The plots of FIG. 2B can be used to compare the computer-generated fracture pattern realizations with the microseismic data to determine which fracture pattern realizations correspond to the microseismic data. The comparison can be implemented using a variety of techniques. As discussed with respect to FIG. 6A, the comparison can be fully automated, requiring little or no human interaction for comparing and/or selecting fracture patterns that correspond to the microseismic data. Also discussed with respect to FIG. 6A, the comparison can utilize human interaction and/or human feedback for comparing and/or selecting fracture patterns that correspond to the microseismic data.

As shown in FIG. 2B, the fracture pattern 202a more accurately represents the microseismic data than the fracture pattern 202g. For example, the microseismic data points 210a, 210b, 210c, and others are all relatively close to the fracture 208a. By contrast, the microseismic data points 210a, 210b, and 210c are relatively far from the closest fracture 208d. As such, the fracture pattern 202a may be selected as an accurate representation of the microseismic data, and the fracture pattern 202g may not be selected as an accurate representation of the microseismic data. FIG. 2C is a plot of the nine example fracture patterns of FIG. 2B, showing which individual fracture patterns were selected based on a comparison of the fracture pattern with the overlaid microseismic data. As shown in FIG. 2C, example fracture patterns 202a, 202c, 202d, 202e, 202h, and 202i are selected as "matches" that well-approximate the microseismic data, and example fracture patterns 202b, 202f, and 202g are selected as "mismatches" that poorly approximate to the microseismic data. In various implementations, different criteria are used for comparing and selecting fracture patterns. For example, in some implementations, pressure history matching and/or other techniques can be used to compare and select fracture patterns.

The selected fracture patterns 202a, 202c, 202d, 202e, 202h, and 202i can be used to refine the initial probability distributions that were used to generate all nine of the fracture patterns shown in FIG. 2A. For example, refined probability distributions for fracture properties can be generated based on the selected fracture patterns, and new realizations can be generated based on the refined probability distributions. As a particular example, a new probability distribution for fracture spacing can be generated based on the selected fracture patterns 202a, 202c, 202d, 202e, 202h, and 202i, which results in a refined fracture spacing probability distribution. As another particular example, a new probability distribution for fracture trace length can be generated based on the selected fracture patterns 202a, 202c, 202d, 202e, 202h, and 202i, which results in a refined fracture trace length probability distribution. In some instances, a refined probability distribution for a fracture parameter can be normalized and/or combined with another probability distribution for the fracture parameter. For example, multiple field samples from one or more subterranean regions can be combined and/or refined. Probability distributions can be combined, for example, by summing and renormalizing the probability distributions, or by another technique.

FIG. 3A is an example generic probability distribution for an example fracture parameter. The horizontal axis represents a range of values for a fracture parameter (e.g., fracture dip, direction, length, density, spacing, aperture, center point location, persistence, etc.), and the vertical axis represents a range of probabilities. Each point on the line plot between the axes indicates the probability of a fracture in a subterranean formation having the corresponding fracture parameter value. The example line plot in FIG. 3A is generated based on a continuous log normal distribution. Generic probability distributions may include discrete distributions, and/or generic probability distributions may have other functional forms, such as a log normal distribution, a normal distribution, an exponentially decaying distribution, a Poissonian distribution, and/or others. In some cases, the generic probability distribution can be refined based on microseismic data, so that the refined probability distribution more accurately represents the distribution of parameters in a particular geographic region or formation. In some cases, a generic probability distribution may be generated, for example, based on the techniques described with respect to FIGS. 7A, 7B, and/or 7C.

FIG. 3B is an example of an initial sample distribution for an example fracture parameter. The horizontal axis represents individual values for a fracture parameter, and the vertical axis represents a range of probabilities. Each bar in the bar plot between the axes indicates the probability of a fracture in a subterranean formation having the corresponding fracture parameter value. The initial sample distribution is generated by randomly sampling the generic probability distribution of FIG. 3A. In some implementations, a distribution may be randomly sampled, for example, using a random number generator or a pseudorandom number generator. For example, software programs such as Mathematica (distributed by Wolfram Research), MATLAB (distributed by The Math Works), and/or other programs may be used to randomly sample a probability distribution. The initial sample distribution may represent the distribution of fracture parameters in one or more realizations of a natural fracture pattern model. In some implementations, an initial sample distribution is generated for each natural fracture pattern model. In some implementations, an initial sample distribution is generated for multiple natural fracture pattern models. In some cases, a refined probability distribution can be generated from one or more initial sample distributions based on a comparison of microseismic data with the fracture pattern models generated using the initial sample distribution.

FIG. 3C is an example refined probability distribution for an example fracture parameter. As in FIG. 3B, the horizontal axis in FIG. 3C represents individual values for a fracture parameter, and the vertical axis represents a range of probabilities. Each bar in the bar plot between the axes indicates the probability of a fracture in a subterranean formation having the corresponding fracture parameter value. The example refined probability distribution in FIG. 3C is generated by selecting values from the initial sample distribution in FIG. 3B. The values selected from the initial sample distribution and included in the refined distribution may be chosen based on a comparison of a fracture pattern model with microseismic event data. For example, a refined probability distribution can be the output of an one or more iterations of the refinement process described with respect to FIGS. 2A, 2B, 2C, and 6A. In some cases, the refined probability distribution can be a more accurate representation of the distribution of values of the fracture parameter in a particular geographic area, formation, field, layer, etc. In some cases, the refined probability distribution can be further refined based on additional microseismic data (e.g., by iterating the refining technique), so that the refined probability distribution more accurately represents a particular geographic area, formation, field, layer, etc.

Any of the probability distributions shown in FIGS. 3A, 3B, and 3C, as well as other types of probability distributions can be used to generate, and/or can be included in, a probabilistic earth model. The probabilistic earth model can be used to populate an initial geometric model of a subterranean formation. For example, populating the initial geometric model may include generating a natural fracture pattern model for the subterranean formation, which can serve as a starting point for complex fracture propagation simulations.

FIG. 4A shows an example input geometric model 400a, which includes discrete elements representing individual rock blocks of a subterranean formation. An input geometric model may represent rock blocks defined by a natural fracture network in a subterranean formation. The geometric model 400a includes seven discrete rock blocks of varying shapes and sizes. In some implementations of a geometric model, each rock block may itself include one or more fractures. For example, each of the seven rock blocks in the geometric model 400a may include one or more fractures that are not shown in FIG. 4A. The example geometric model 400a is a simplified example, and a geometric model may generally include many more discrete elements of arbitrary shapes and sizes. A geometric model may also include rock blocks of uniform shapes and sizes.

A geometric model may include information representing the boundaries, locations, orientations, shapes, and/or other properties of rock blocks in a rock formation. For example, information on a boundary of a rock block may describe a shape of the rock block (e.g., square, triangular, elliptical, or an arbitrary shape) in any suitable manner. A shape of a rock block may be represented, for example, by variables or data structures that describe vertex locations, vertex angles, side lengths, arc lengths, arc angles, connectivity or lack thereof, and/or other properties. The information on the boundaries of a rock block may include information on a location of the rock block and/or information on an orientation of the rock block. A location of a rock block may be represented by variables or data structures that describe one or more vertex locations, a center point location, and/or other types of information. Location may be described with respect to a reference location, a location on a grid, with respect to other rock blocks, and/or in another manner. In some cases, a subterranean formation model used for complex fracture simulation includes a geometric model that describes boundaries of the formation. Information on boundaries, locations, orientations, shapes, and/or other properties of rock blocks may include two-dimensional data, three-dimensional data, and/or other types of data. For example, a geometric model may represent a two-dimensional plane in a formation, and the information on boundaries of rock blocks may include boundaries within the two-dimensional plane. As another example, a geometric model may represent a three-dimensional volume in a formation, and the information on boundaries of rock blocks may include surface and/or edge boundaries within the three-dimensional volume.

One or more input geometric models can be generated based on a probabilistic earth model. For example, a probabilistic earth model can be used to generate a natural fracture pattern for a subterranean formation, and the resulting fracture pattern can be used to define the boundaries, locations, shapes, and/or orientations of the rock blocks represented by the input geometric model. Thus, the boundaries of the elements of an input geometric model may represent a natural fracture network in a subterranean formation. In probabilistic simulations, several input geometric models are generated by independently sampling probability distributions of a probabilistic earth model. Each input geometric model can be used to simulate complex fracture propagation in the formation represented by the geometric model; the simulation of each geometric model generates an output geometric model. The output geometric models can be analyzed individually and/or collectively to predict an outcome of an injection treatment, drilling, and/or other subterranean activities. In some cases, an input geometric model can be generated by another technique, such as a deterministic earth model.

A geometric model representing rock blocks of a subterranean formation can be used with a discontinuum model to numerically simulate complex fracture propagation in the subterranean formation. The discontinuum model can simulate internal and external forces acting on each rock block represented by the geometric model. The simulated forces can include natural geological forces acting on the rock blocks independent of any drilling, production, or treatment activity. The simulated forces can include forces generated in part or in full due to drilling activities, production activities, and/or treatment activities. Such simulations can predict behavior of the rock blocks in response to the modeled forces. For example, the output geometric model can include complex fracture networks, including fractures that extend to a well bore, along multiple azimuths, in multiple different planes and directions, along discontinuities in rock, and in multiple regions of a reservoir. The discontinuum model may simulate rotations, translations, deformations, fractures, and other types of responses of each individual rock block.

The geometric model 400a can be used with the DDA technique, the NMM technique, variations of these techniques, and/or other techniques to simulate complex fracture propagation in a subterranean formation. The DDA technique can be formulated with rock displacements as the unknowns, and the technique can solve for the displacements by minimizing the energy of a block system for a given load. According to the DDA technique, translation, rotation, normal strain, shear strain, and possibly other functions are permitted for each rock block. In some implementations, there is no tension between blocks and no penetration of one block into another. Rock block contact constraints can be numerically implemented with "penalty submatrices" within a global stiffness matrix. A penalty submatrix can effectively insert a "spring" (i.e., a force model that varies linearly with position) or another type of force at the contact point between rocks, and the spring stiffness can be sufficient to prevent penetration.

In some implementations of the DDA technique, when a shear component of force between rock blocks is greater than a frictional force between the rocks blocks (e.g., friction according to Coulomb's law or another functional form), block sliding can occur along the contact. Modeling the friction forces can be accomplished by modeling a spring force parallel to a reference line along a contact. The DDA technique can include a variety of different block contact algorithms, sub-blocking algorithms, and/or fracturing algorithms. An example block contact algorithm uses an iterative Augmented Lagrangian technique for obtaining exact solutions for contact forces. The Augmented Lagrangian technique can utilize the spring model for block contacts, while adding a Lagrangian multiplier. Implementing the Augmented Lagrangian technique may reduce or eliminate uncertainty associated with selecting an arbitrarily large spring constant to constrain block penetration using the penalty method. Other approaches utilize a sub-blocking algorithm that subdivides each block and uses dual springs along and across each internal contact to enforce a "no-intrablock-displacement" constraint. Including the sub-blocking algorithm may allow tensile stresses to be transferred through sub-block contacts. A fracturing algorithm can also be added. An example fracturing algorithm uses a Mohr-Coulomb criteria to model block fracturing.

Along with a DDA-based approach or another approach, a discontinuum model for simulating complex fracture propagation in a subterranean formation may also incorporate fluid flow, fracture failure criteria, initiation tests for each block, intrablock fracture propagation models, and/or other features. A fluid flow model may include, for example, steady-state fluid flow in the fractures, unsteady-state fluid flow in the fractures, sink/source terms, transient interporosity flow, and other types of flow.

As another example, the geometric model 400a can be used with the NMM technique. Like the DDA technique, the NMM technique can be used to study the mechanical behavior of discontinuous rock masses. For example, the NMM technique can be used to analyze fissures, cleavages, joints, faults, and/or other features of rock blocks.

In some implementations, the NMM technique utilizes a two-layer model to describe a physical rock block system. The two-layer model includes two mesh layers: a mathematical mesh and a physical mesh. The physical mesh represents the physical boundaries and/or discontinuities of the rock blocks. For example, a physical mesh can be generated based on the geometric model 400a. The physical mesh may include, for example, information on fissures, cleavages, joints, faults, boundaries, locations, and/or other physical features of the rock block system. The mathematical mesh is a regular pattern or grid of geometric shapes (e.g., triangles, rectangles, etc.) that can be overlaid onto the physical mesh. The mathematical mesh is larger than the physical mesh, and the size of the grid elements (i.e., the size of the geometric shapes that the mathematical mesh is composed of) can be determined, for example, based on computational precision requirements, computational accuracy requirements, and/or other considerations. A covered manifold mesh is constructed by overlaying the mathematical mesh onto physical mesh and trimming the mathematical mesh at the boundaries of the physical mesh. The covered manifold mesh, which includes the part of the mathematical mesh that intersects the physical mesh, may be used to simulate mechanical behavior of the rock block system, for example, to simulate fracture growth, fracture dilation, fracture propagation, rock block movement, and/or other phenomena.

In some implementations of the NMM technique, the covered manifold mesh includes nodes and elements that provide a framework for simulating dynamics of the rock block system. The nodes and elements may be identified based on the geometric shapes of the mathematical mesh grid. For example, when the mathematical mesh is a grid of triangles, each triangle can be an element and each corner of a triangle can be a node. Each node may contact (or "cover") multiple elements. For example, when the mathematical mesh is a grid of triangles, each node may cover six triangular elements. The boundaries of the elements need not coincide with the boundaries of the physical mesh. Instead, weighting functions are used to connect the physical mesh with the mathematical mesh and to track the physical boundaries of the rock block system. For example, when an element contains a discontinuity, thus dividing the element into two parts, the nodes covering that element can be duplicated, and one set of the duplicated nodes can be used to track a first part of the element, and the other set of duplicated nodes can be used to track a second part of the element. The weighting function for a node can be used to identify which part of each element is tracked by the node.

To solve for displacements, the NMM technique may use a Simplex integration technique. In some implementations, the Simplex integration technique converts an integration over an arbitrary area to a sum of integrations over many grid elements (e.g., triangles, or another shape) of the arbitrary area, and each grid element is evaluated analytically. For example, the Simplex technique can be used to solve for first-order linear displacements of each node. The Simplex technique can be used to solve for higher order (second-order, third-order, etc.) displacements of the nodes. To model the kinematics of the rock block system, the NMM technique may utilize the same contact modeling approach as the DDA technique. For example, the NMM technique can model kinematics with the constraints of (1) no tension between blocks and (2) no penetration of one block into another. The NMM technique may also utilize the Lagrangian multiplier approach, the augmented Lagrangian multiplier approach, and penalty matrices that are used in connection with the DDA technique.

Figure 4B:
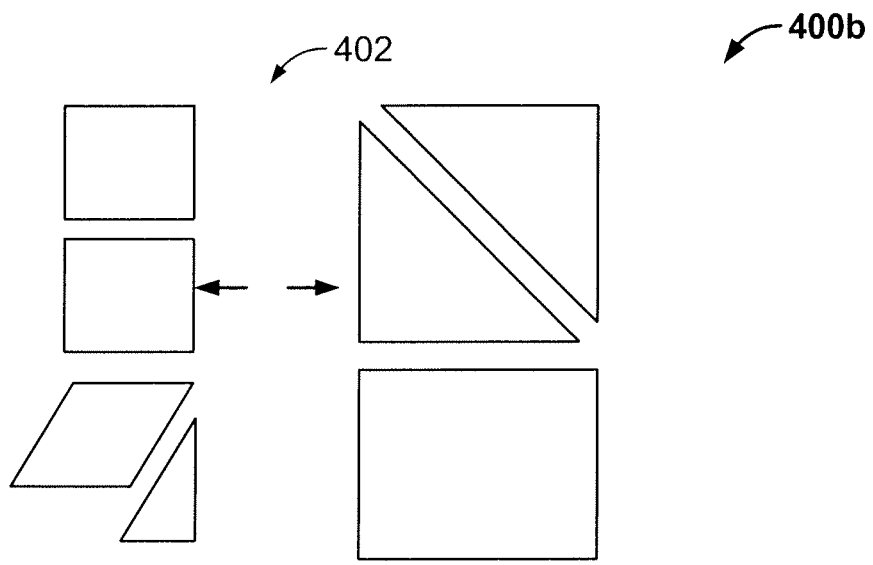
FIGS. 4B and 4C are diagrams of example movements of the discrete rock blocks of the subterranean formation of FIG. 4A.

FIG. 4B shows an example output geometric model 400b, which could result from a discontinuum model simulation of the geometric model 400a of FIG. 4A. The example output geometric model 400b includes a tensile fracture 402. A tensile fracture may occur in a formation when rock blocks fracture and/or separate. As such, a tensile fracture can be simulated in a geometric model when the forces modeled by the simulation cause elements of the geometric model to fracture or separate along a fracture boundary perpendicular to the fracture plane.

Figure 4C:
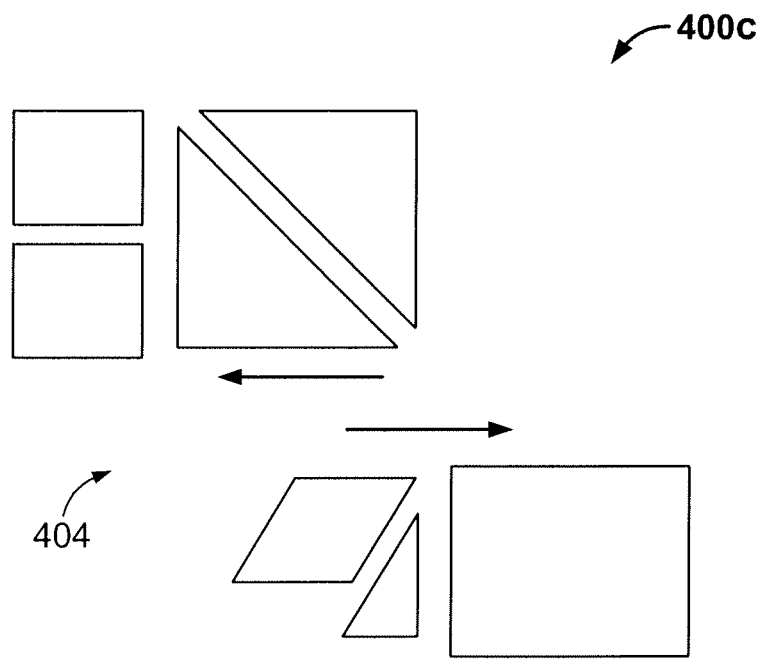

FIG. 4C shows an example output geometric model 400c, which could result from a discontinuum model simulation of the geometric model 400a of FIG. 4A. The example output geometric model 400c includes a shear fracture 404. A shear fracture may occur in a formation when a rock block fractures or slides along a fracture boundary due to shear forces, acting parallel to the fracture plane. As such, a shear fracture can be simulated in a geometric model when the shear forces modeled by the simulation cause one element of the geometric model to fracture or slide along a fracture boundary parallel to the fracture plane.

An output geometric model can include other types of fractures and effects that are not shown in the example output geometric models 400b and 400c. For example, in some implementations, the elements of the geometric model can fracture or split to form additional elements in the geometric model, the elements of the geometric model can rotate and/or translate to change the orientation and/or position of the elements in the geometric model; the elements of the geometric model can deform to change the shapes of the elements in the geometric model, and/or the geometric model can exhibit other effects.

Figure 5:
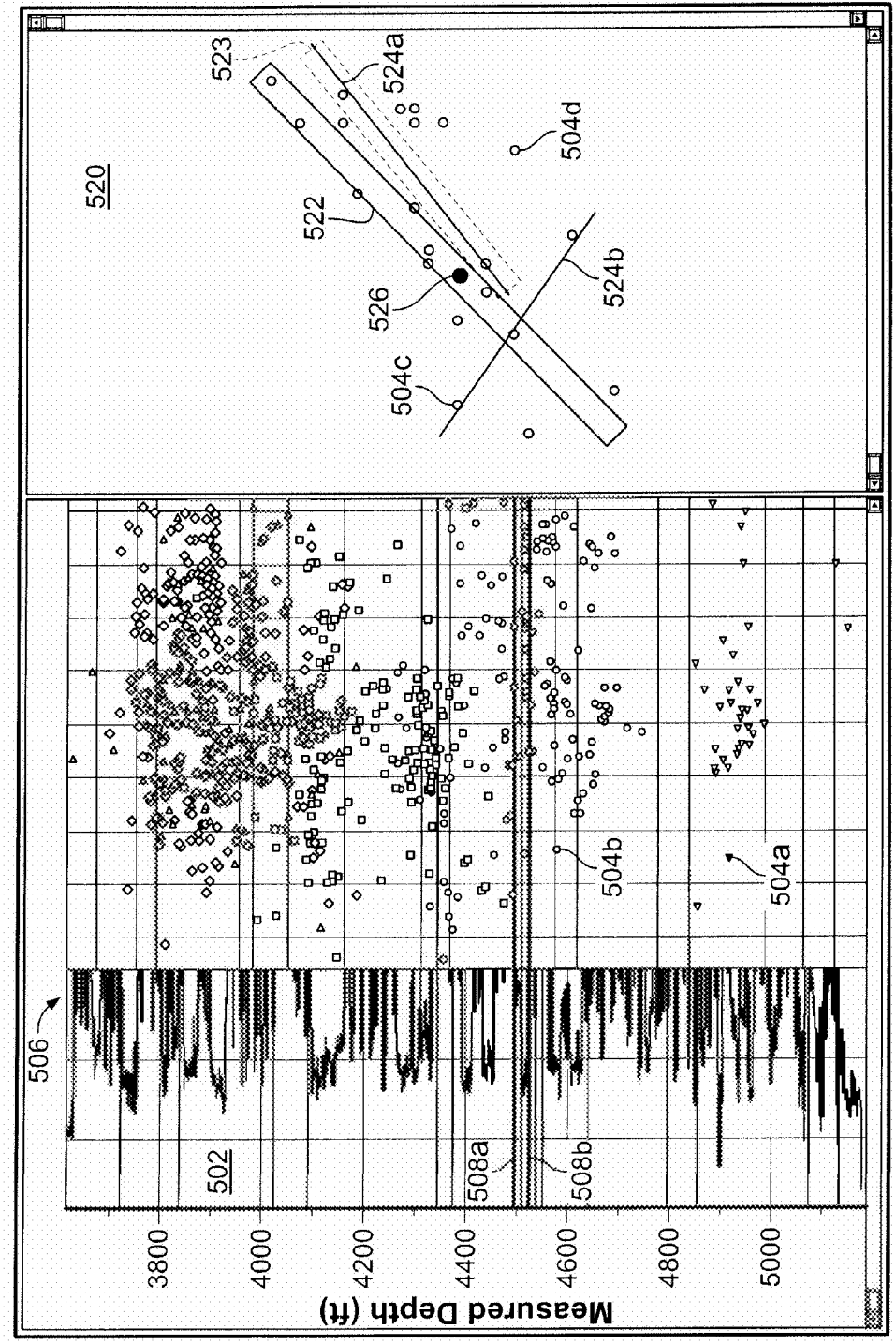
FIG. 5 shows an example screen shot of a software tool for simulating fracture propagation in a subterranean formation.

Some embodiments and/or some aspects of the techniques and operations described herein may be implemented by one or more software programs or applications running on a computing device configured to provide the functionality described. Such software programs and applications can include installed applications, executable files, interne applications, and/or other types of software tools. For example, a software application can be designed to analyze microseismic data, to identify properties of natural fractures (e.g., fracture density, fracture orientation, fracture direction, fracture trace length, and/or others), to generate and/or refine probability distributions of natural fracture parameters, to generate geometric models of natural and/or complex fracture patterns, to simulate one or more injection treatments in a stochastic or deterministic manner, to predict rock blocks behavior during an injection treatment, to simulate resource production, and/or to perform other operations. In some instances, an application provides a graphical user interface that displays information to a user and may also allow a user to provide input. A graphical user interface can be displayed on a display device, such as a monitor, a display screen, or another type of device. FIG. 5 shows an example screen shot 500 of a graphical user interface generated by a software tool for simulating fracture propagation in a subterranean formation. Such numerical simulation software can be used to analyze microseismic data and/or to simulate complex fracture propagation over a broad range of vertical depths, across vertical discontinuities, over a broad planar range, across horizontal discontinuities, encompassing diverse formations and complex fracture networks.

The example screen shot 500 includes a first pane 502 (shown on the left in FIG. 5) and a second pane 520 (shown on the right in FIG. 5). The first pane 502 presents an elevation view of the rock layers and microseismic event locations projected onto an xz-plane. In the first pane 502, the vertical z-axis represents the vertical depth dimension in the subterranean formation (e.g., distance below the surface, altitude, etc.), and the horizontal x-axis represents a horizontal dimension in the formation (e.g., corresponding to a range of latitudes, a range of longitudes, or a combination). The second pane 520 presents a plan view of a rock layer of the subterranean formation and microseismic event locations projected onto the xy-plane. In the second pane 520, the vertical y-axis and horizontal x-axis both represent horizontal dimensions in the formation.

In the first pane 502, a vertical line plot 506 indicates changes in rock lithology in the formation. To the right of the vertical line plot 506, locations of microseismic events are plotted. As in FIGS. 2B and 2C, each microseismic data point can include information on a location associated with a microseismic event, information on a magnitude associated with the microseismic event, information on a time associated with the microseismic event, information on an error associated with each microseismic event, and/or other information. For example, the data points 504a and 504b represent measured microseismic event locations. The first pane 502 presents paired lines 508a and 508b that indicate a selected horizontal layer of the subterranean formation. The second pane 520 presents a plot of the microseismic events in the vertical range between the paired lines 508a and 508b. For example, the data points 504c and 504d in the second pane 520 represent two of the microseismic event locations between the paired lines 508a and 508b. In some implementations, a user can move (e.g., click and drag) one or both of the paired lines 508a and 508b to select a different layer and/or additional layers of the subterranean formation.

The shape of each data point in the first pane 502 and/or second pane 520 (e.g., data points 504a, 504b, 504c, 504d, etc.) indicates the stage of fracture treatment when the microseismic data corresponding to that point was collected—data points having the same shape (e.g., circle, triangle, left square, right triangle, diamond, etc.) were collected during the same fracture treatment stage. In some implementations, data points may be color coded, shaded, and/or otherwise configured based on the stage of an injection treatment that produced the events, based on the magnitude of the events, based on the error associated with the events, and/or based on other information. For example, microseismic events recorded during a pad phase may be shaded with a first color, and microseismic events recorded during a proppant-laden phase may be shaded with a second color. The center point 526 in the second pane 520 may represent, for example, a well center for a vertical well, a fracture stage entry point center for a horizontal well, and/or another reference location. In some implementations, a reference line may also be presented in the first pane 502 to represent, for example, a well center for a vertical well, a fracture stage entry point center for a horizontal well, and/or another reference location, and microseismic events may be plotted in the xz-plane relative to the reference line.

In some implementations, microseismic events are recorded with respect to time, and a user interface control (e.g., a slider, or another type of control) in the software tool may allow the microseismic events in the first pane 502 and the second pane 520 to be animated. In some implementations, a view and/or zoon control allows one or more of the plots presented in the user interface to be expanded, contracted, panned, and/or otherwise manipulated.

In the second pane 520, a solid rectangle 522 represents an area that contains a propagated fracture, for example, a fracture that was initiated and propagated through the formation during an injection treatment. The propagated fracture extends through the center point 526. The microseismic events in the solid rectangle 522 may be excluded when analyzing the microseismic data to identify natural fractures and/or properties of a natural fracture network. A dotted rectangle 523 represents an area that contains a natural fracture, for example, a fracture that existed in the formation prior to the injection treatment that initiated and propagated the fracture in the solid rectangle 522. The line 524a indicates a natural fracture. The location and other properties of the natural fracture may be determined, for example, based on the times, the locations, the magnitudes, and/or other properties of the microseismic events in the rectangle 523. The line 524b indicates estimated locations of a second natural fracture. The estimated locations of the natural fractures may be used to estimate, calculate, and/or otherwise identify properties of a natural fracture network.

Figure 6A:
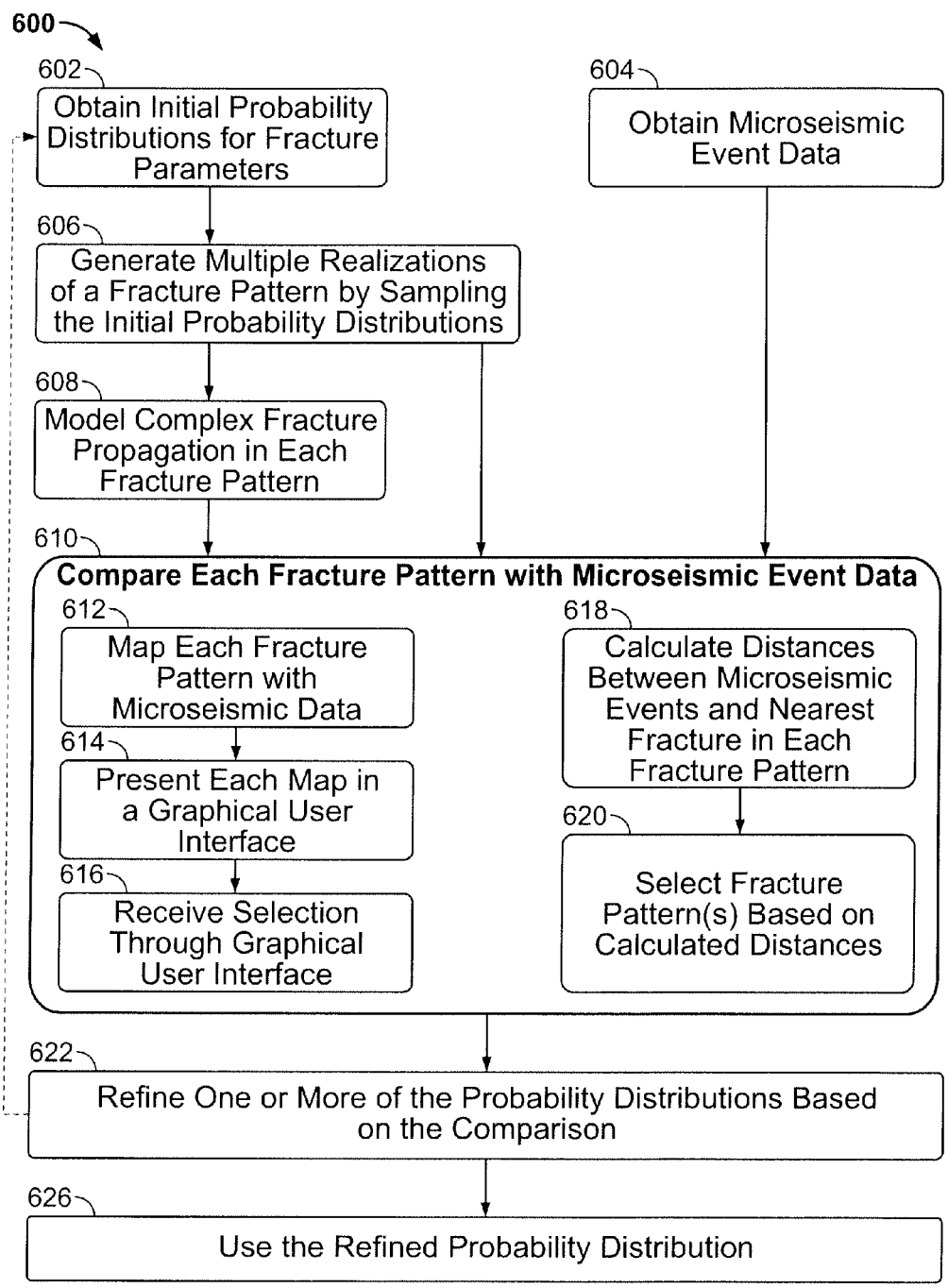
FIG. 6A is a flow chart of an example technique for refining a probability distribution of subterranean fracture properties.

FIG. 6A is a flow chart of an example process 600 for refining a probability distribution of subterranean fracture properties. Some or all of the operations in the process 600 can be implemented by one or more computing devices. In some implementations, the process 600 may include additional, fewer, and/or different operations performed in the same or a different order. Moreover, one or more of the individual operations and/or subsets of the operations in the process 600 can be performed in isolation and/or in different contexts to perform one or more of the disclosed techniques. Output data generated by the process 600, including output generated by intermediate operations, can include stored, displayed, printed, transmitted, communicated and/or processed information.

At 602, an initial probability distribution for one or more fracture parameters is obtained. For example, the initial probability distribution can be obtained by reading the initial probability distribution from a memory, by receiving the initial probability distribution from a remote device, and/or in a different manner. The fracture parameters can include one or more fracture parameters for a subterranean formation. Example fracture parameters include orientation, direction, dip, length, depth, density, spacing, aperture, persistence, and others. The initial probability distribution can include a generic probability distribution. For example, a generic distribution of fracture lengths for shale may include a range of values of fracture length observed in typical shale formations and a probability associated with each value in the range. The probability may indicate the likelihood of finding a fracture having a given length in a typical shale formation. The initial probability distribution can include an initial sample probability distribution. For example, an initial sample distribution of fracture lengths for a formation may include values of fracture length observed in a particular formation and a probability associated with each value. The probability may indicate the observed likelihood of a fracture having a given length in the particular formation. The initial probability distribution may be generated, for example, based on the techniques described with respect to FIGS. 7A, 7B, and/or 7C.

At 604, microseismic event data is obtained. The microseismic event data can be obtained by reading the microseismic event data from a memory, by receiving the microseismic event data from a remote device, and/or in a different manner. The microseismic event data may include information on the measured locations of multiple microseismic events, information on a measured magnitude of each microseismic event, information on an uncertainty associated with each microseismic event, and/or information on a time associated with each microseismic event. The microseismic event data may include microseismic data collected at an observation well, at a treatment well, at the surface, and/or at other locations in a well system. The microseismic data (604) and the probability distributions (602) may correspond to the same subterranean region, formation, or well, or the microseismic data (604) and the probability distributions (602) may correspond to the different subterranean regions, formations, or wells. In some examples, the initial probability distribution is based on a treatment well data log, and the microseismic data includes information collected during treatment and/or production activity at the treatment well.

At 606, multiple realizations of a fracture pattern realization are generated by sampling the probability distributions. For example, one or more data objects defined in memory can represent each fracture pattern realization. A data object representing a fracture pattern realization may include values that represent the locations, sizes, shapes, connectivity, and other features of each fracture in the fracture pattern. Properties of each fracture in a fracture pattern realization can be determined based on randomly sampling the initial probability distributions. For example, the length of a given fracture in a fracture pattern realization may be determined by generating a random number and using the random number to select a value from an initial probability distribution for the trace length parameter. As another example, the spacing of a set of fractures in a fracture pattern realization may be determined by generating a random number and using the random number to select a value from the initial probability distribution for the spacing parameter. Each of the nine realizations in FIG. 2A is an example fracture pattern model.

Each fracture pattern model generated at 606 can represent an estimated or predicted natural fracture pattern for a subterranean formation. The natural fracture pattern realizations generated at 606 can be compared to microseismic event data at 610. Alternatively or additionally, in some implementations, complex fracture propagation can be simulated in each fracture pattern realization at 608 before the fracture patterns are compared to microseismic event data at 610. In either situation, at 610, each fracture pattern realization, which may include a natural fracture pattern and/or propagated complex fractures, is compared with the microseismic event data obtained at 604.

The comparison at 610 can be implemented using a variety of different techniques. Two example techniques are shown in FIG. 6A. Other techniques may also be used. In a first example technique for comparing the fracture pattern models with microseismic event data, at 612, each fracture pattern is mapped or plotted with the microseismic event data. For example, FIG. 2B shows nine fracture pattern models mapped with microseismic event data overlaid on each fracture pattern. At 614 (and as shown in the example in FIG. 2B), each fracture pattern model mapped with microseismic event data can be presented (e.g., to a user) in a graphical user interface. Each fracture pattern model mapped with microseismic event data, or groups of fracture pattern models mapped with microseismic event data, can be presented sequentially or concurrently. Presenting the fracture pattern models mapped with microseismic event data may allow a user to visually inspect each map to determine whether the microseismic data corresponds to the fracture pattern. At 616, selections of one or more fracture pattern models are received (e.g., from a user interface device, through the graphical user interface, etc.). For example, the selections may indicate "matches," which are fracture pattern realizations that accurately approximate the microseismic data, or the selections may indicate "mismatches," which are fracture pattern realizations that poorly approximate the microseismic data. For example, FIG. 2C shows an example of three selected mismatches that have been identified, in the example shown, as poorly approximating the microseismic data.

In some implementations, the comparison of the fracture pattern models with the microseismic data may be performed in an automated manner, without utilizing human interaction. In a second example technique for comparing the fracture pattern models with microseismic event data, at 618, distances between microseismic events and the nearest fracture in each fracture pattern model are calculated. The distances can be calculated, for example, by a processor. In some implementations, for each microseismic data point, a nearest fracture (i.e., a fracture nearest the microseismic data point) is identified in each fracture pattern model. A distance to the nearest fracture from the microseismic data point can be calculated for each microseismic data point and for each fracture pattern model. The calculated distances may account for uncertainty associated with the locations of the microseismic data points. In some cases, the calculated distances can be weighted based on the magnitude of the microseismic event. For example, a larger magnitude microseismic event may be weighted more heavily than a lower magnitude microseismic event. The weighting can be linear, polynomial, exponential, logarithmic, a combination of those, and/or another type of weighting. At 620, fracture pattern models are selected based on the distances calculated at 618. Selecting fracture pattern models may include determining for each fracture pattern model one or more indices based on the calculated distances. For example, the distances (or the weighted distances) may be summed (and/or combined in another manner) for each fracture pattern model to generate one or more indices. As another example, the largest or smallest distances (or weighted distances) may be identified for each fracture pattern model to generate one or more indices. The index (or indices) for each fracture pattern (which may include the combined distances, selected distances, and/or another type of index) can be used to determine whether the microseismic data corresponds to that fracture pattern. For example, a fracture pattern model having an index greater than a threshold value can be designated a "mismatch," and/or a fracture pattern model having an index less than a threshold value can be designated a "match." As another example, the index for each fracture pattern can be compared to the indices for the other fracture pattern models, and a subset of the fracture pattern models can be selected based on the comparison.

At 622, the probability distributions are refined based on the comparison. The refined probability distribution is generated based on the results of comparing the generated fracture patterns with the microseismic event data. The refined probability distribution may represent the natural fracture parameter of the subterranean formation more accurately than the initial probability distributions used to generate the fracture patterns.

Refining the probability distribution for a given fracture parameter may result in an increase in the probability for certain values of the parameter and/or a decrease in the probability for certain values of the parameter. The particular probabilities that are increased and/or decreased and the amount by which they are increased and/or decreased may be determined based on the selected fracture pattern models. For example, the refined distribution of fracture lengths can be generated based on the "matches" and/or the "mismatches" identified at 610. For example, the refined distribution can be generated according to the values of fracture parameters in each of the "matches." In some implementations, the values of fracture parameters in each of the "matches" becomes a sample, and the refined distribution is calculated based on the sample. In some instances, the refined distribution can be renormalized and/or combined with a distribution for a nearby field, well, or formation.

The refinement of a probability distribution may result in the probability distribution more accurately representing the physical properties of the subterranean formation represented by the microseismic data. A fracture pattern model generated based on the refined probability distribution may correspond more closely to the microseismic data than a fracture pattern model generated based on the initial probability distribution. In some cases, at 622, a probability will be increased for values of a parameter occurring frequently in the fracture pattern realizations that accurately represent the microseismic data, and/or a probability may be decreased for values of a parameter occurring infrequently in the fracture pattern realizations that accurately represent the microseismic data. In some cases, a probability will be decreased for values of a parameter occurring frequently in the fracture pattern realizations that do not accurately represent the microseismic data, and/or a probability will be increased for values of a parameter occurring infrequently in the fracture pattern realizations that do not accurately represent the microseismic data.

After the probability distributions are refined at 622, one or more operations of the process 600 may be iterated using the refined probability distributions as input probability distributions. For example, some or all of the operations 602, 606, 608, 610, and 622 and associated sub-processes can be repeated in an iterative manner, further refining the probability distribution upon each iteration. In some cases, such an iterative process can be repeated until an end condition is satisfied. For example, the end condition can be based on the absolute or relative amount by which the probability distribution is refined in each iteration, the end condition can be based on the number of iterations, and/or the end condition can be based on other factors.

At 626, the refined probability distributions are used. The refined probability distributions can be used for a variety of purposes. For example, the refined probability distributions can be incorporated into a probabilistic earth model. A probabilistic earth model and/or the refined probability distribution can be used to generate an input geometric model for numerical simulations of complex fracture propagation in a subterranean formation.

A probability distribution can be refined according to the process 600 based on microseismic data in a first region or formation, and the refined probability distribution can be applied to simulations of another region or formation. As such, the refining process can produce an output probability distribution that is extrapolated to a different region, zone, formation, field, or well site.

In some implementations, pressure history matching may also be used to refine a probability distribution for fracture parameters. In some implementations, in addition to comparing fracture pattern models to microseismic event data, formation pressures observed during an injection treatment are compared to formation pressures simulated using the fracture pattern model. For example, a fracture pattern models (e.g., "matches" or "mismatches") may be selected based on a correlation (or lack thereof) between observed formation pressure and simulated formation pressure. The observed formation pressure may be recorded during an injection treatment, and the fracture pattern model may be used to calculate a model formation pressure. Selecting fracture property values that minimize the difference between the observed formation pressure and the model formation pressure may lead to an improved distribution of fracture property values. For example, comparisons of surface pressure, bottomhole pressure, closure pressure, and/or net pressure (i.e., the difference between bottomhole pressure and closure pressure) can be used. A pressure matching technique may present graphical comparisons to a user (e.g., Cartesian, log-log, and/or other plots of observed pressure and model pressure versus time) and receive input from the user based on the graphical comparisons. A pressure matching technique may include an automated technique that calculates differences between observed and model formation pressures over time. In some implementations, an observed complex fracture geometry may be compared to complex fractures in a fracture pattern model. For example, fracture pattern models may be selected based on pressure history matching, microseismic data matching, propagated fracture geometry matching, and/or other types of observed/model data matching.

Figure 6B:
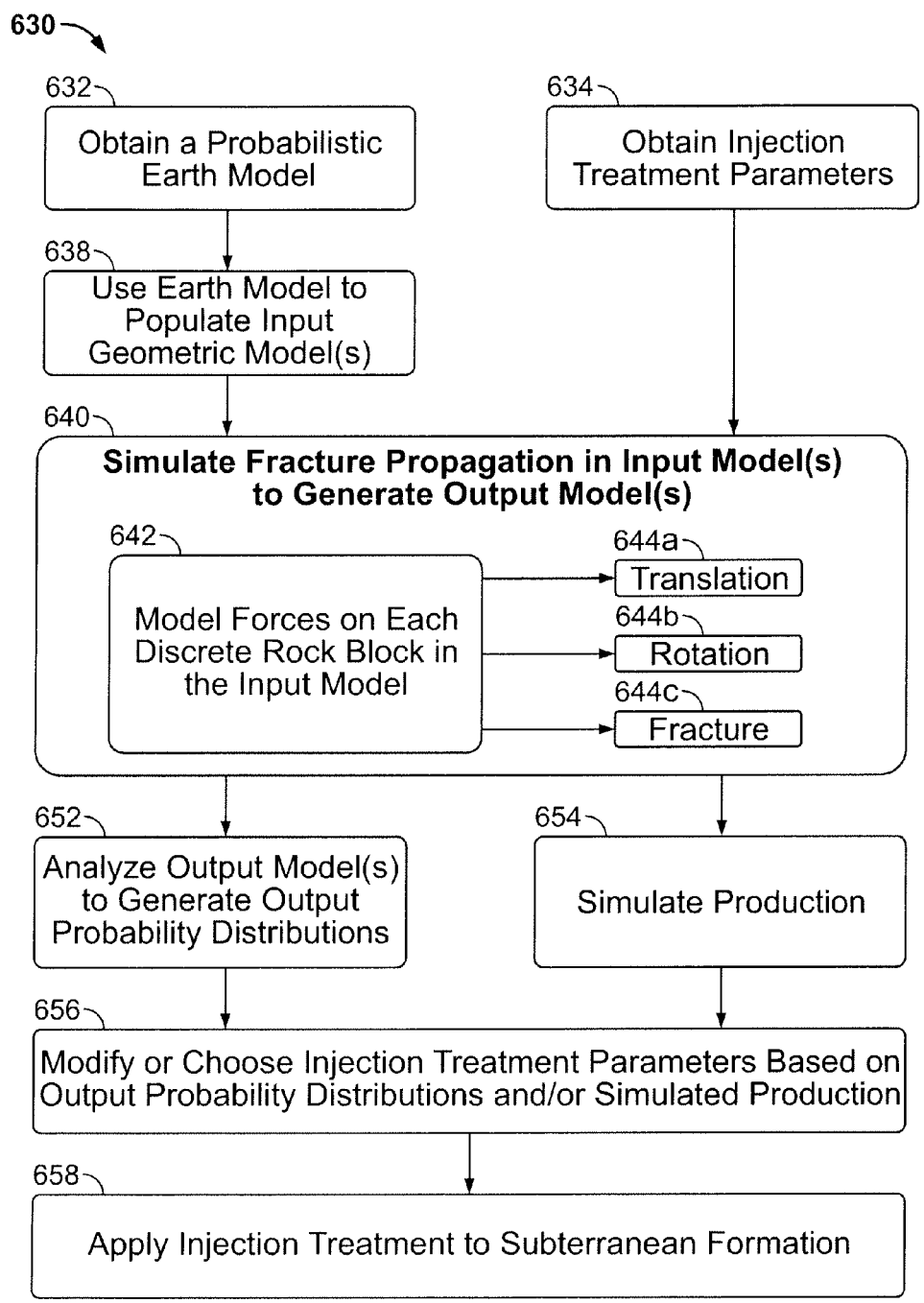
FIG. 6B is a flow chart of an example technique for simulating complex fracture propagation in a subterranean formation.

FIG. 6B is a flow chart of an example process 630 for simulating complex fracture propagation in a subterranean formation. The process 630 may be used for probabilistic simulation of complex fracture propagation. For example, the process 630 may include simulating complex fracture propagation in multiple realizations of an input geometric model, thereby generating multiple output geometric models. Such probabilistic simulations may be implemented by iterating one or more operations of the process 630. Each iteration may include a single geometric model, or multiple geometric models may be simulated in parallel in each of one or more iterations. Some or all of the operations in the process 630 can be implemented by one or more computing devices. In some implementations, the process 630 may include additional, fewer, and/or different operations performed in the same or a different order. Moreover, one or more of the individual operations and/or subsets of the operations in the process 630 can be performed in isolation and/or in different contexts to perform one or more of the disclosed techniques. Output data generated by the process 630, including output generated by intermediate operations, can include stored, displayed, printed, communicated, transmitted, and/or processed information.

At 632, a probabilistic earth model for a subterranean region is obtained. For example, the probabilistic earth model can be obtained by reading the probabilistic earth model from a memory, by receiving the probabilistic earth model from a remote device, and/or in a different manner. A probabilistic earth model for a subterranean region describes characteristics of the subterranean region and accounts for uncertainty in some or all of the characteristics. The uncertainty may result from imprecise or incomplete knowledge of the characteristics, inhomogeneity of the characteristics, and/or other sources of uncertainty. The probabilistic earth model may include probability distributions for characteristics of the subterranean region and/or rock formations in the subterranean region. For example, probabilistic earth model may include (or be generated based on) the refined probability distributions generated by the process 600 of FIG. 6A. The characteristics of the subterranean region described by the probabilistic earth model may include sizes and/or locations of rock formations in the region, composition of formation materials (e.g., shale, sandstone, carbonates, coal, mudstone, granite, and/or others), density of the formation materials (e.g., mass density, etc.), the amount void space in the material (e.g., porosity, etc.), the formation material's ability to transmit fluids (e.g., permeability, etc.), natural fracture properties of the formation (e.g., dip, direction, orientation, density, spacing, length, location, aperture, etc.), major faults in the region and/or formations in the region (e.g., location, size, orientation, etc.), and/or other characteristics.

A probabilistic earth model for a subterranean region may be generated, for example, based at least in part on data from one or more locations and/or rock formations in the subterranean region, data from an outcrop in the subterranean region, microseismic data from the subterranean region, seismic data from the subterranean region, pressure transient data from the subterranean region, or open hole logging of a well bore in the subterranean region. In some instances, a probabilistic earth model includes locations of major faults, which may be known with certainty based on seismic data. In some instances, a probabilistic earth model for a first region may be generated based on open hole logging from adjacent wells, analog fields, and/or other regions and locations. In some implementations, a probabilistic earth model can include data extrapolated from a different location. For example, data from an analog field may be extrapolated to another field to fit one or more data points from a well log. The probabilistic earth model may include additional and/or different information.

At 634, parameters of one or more injection treatments are obtained. For example, the parameters can be obtained by reading the parameters from a memory, by receiving the parameters from a remote device, and/or in a different manner. The injection treatment parameters may include, for example, an injection location, a flow rate, pressure, volume, fluid composition, slurry concentration, information on proppants, information on additives, and/or other data relating to one or more injection treatments. The injection treatment parameters may include, for example, injection locations, injection timings, and/or other information for multiple simultaneous or sequential injection treatments. The injection treatment parameters may relate to a pad phase, a proppant phase, a fluid flush, and/or another aspect of one or more injection treatments. An injection treatment may involve injecting treatment fluid into the formation. For example, fluid can be injected at or below a fracture initiation pressure for the formation, above at or below a fracture closure pressure for the formation, and/or at another fluid pressure.

At 638, the probabilistic earth model is used to populate one or more geometric models of a subterranean formation. In some cases, the geometric models can be obtained by reading the geometric models from a memory, by receiving the geometric models from a remote device, and/or in a different manner. A data object in memory may be used to represent the geometric model. The geometric model may be, or may be included in a subterranean formation model. The geometric model may include a two-dimensional, three-dimensional or another type of geometric model that can be used for simulating complex fracture propagation in the subterranean formation. The geometric model includes multiple discrete elements that represent individual rock blocks of the subterranean formation. A geometric model can include information on boundaries of the rock blocks, which may include estimated boundaries based on the estimated fracture locations. The size, shape, location, orientation, and other properties of the rock blocks, as represented by the geometric model, may be determined based on the probabilistic earth model (e.g., the fractures, discontinuities, and/or other characteristics of the subterranean formation). FIGS. 4A, 4B, and 4C show example geometric models. In some implementations, the geometric model may include an arbitrarily large or small number of discrete elements, and the elements may have arbitrary shapes, sizes, and other properties. In some implementations, a geometric model may include rock blocks of uniform shapes and sizes. In some implementations, constraints may be imposed on the number, shape, size, and/or other properties of the discrete elements. The constraints may be based on the probabilistic earth model and/or practical considerations such as, for example, memory size, computational efficiency, processor speed, desired accuracy, numerical precision tolerance, and/or others.

In the context of probabilistic simulation of complex fracture propagation, each geometric model may be used for one simulation or for multiple simulations. Each geometric model may be generated by sampling the probabilistic earth model. In some implementations, a geometric model may be generated, for example, by generating a natural fracture pattern model based on the probabilistic earth model and then using the natural fracture pattern model to define the boundaries of the geometric model elements. Natural fracture pattern models may be generated as described with respect to operation 606 in FIG. 6A and/or in a different manner. The probabilistic earth model may include probability distributions for characteristics of a subterranean formation, and a natural fracture pattern model may be generated by randomly sampling one or more of the probability distributions.

In an example implementation, the probabilistic earth model includes information on an areal extent of a rock formation (e.g., a 20 acre areal extent, a 500 acre areal extent, and/or other information on an areal extent of a rock formation), and the probabilistic earth model includes probabilistic information on fracture parameters of the rock formation, a shape of the rock formation, a thickness and/or changes in thickness of the rock formation, and/or other properties. By sampling the probabilistic earth model for a given input geometric model, particular values for the natural fracture pattern, size, shape, and thickness of the rock formation are chosen, and the particular values are used to define an input geometric model.

At 640, output geometric models are generated by simulating fracture propagation in each of the input geometric models populated at 638. The simulation can also be based on the injection treatment parameters obtained at 634 and/or other data. For example, the simulation may involve simulating fluid pressure, fluid flow, proppant flow, and/or other physical phenomena in the subterranean formation during one or more injection treatments. The simulated injection treatments may include multiple sequential and/or simultaneous injection treatments. The fracture propagation simulation can be implemented using a variety of different techniques. For example, complex fracture propagation can be simulated using a DDA-based technique, an NMM-based technique, and/or other techniques. Complex fracture propagation simulation can emulate a variety of different subterranean events and properties. For example, simulations of complex fracture propagation can model forces that may be applied to the subterranean formation by one or more injection treatments (e.g., based on the injection treatment parameters), forces that may be applied to the subterranean formation by fluid flow during production, forces that may be applied to the subterranean formation by fluid flow during drilling activities, forces that may be applied to the subterranean formation by natural geological events, and/or other phenomena. In some examples, the discontinuum model is used simulate initiation and growth of a two fractures in two different directions during an injection treatment. For example, a first fracture may initiate and grow in a first direction from a well bore, and a second fracture may initiate and grow in a second direction from the well bore. The two fractures may initiate and grow in non-parallel planes. The directions of the fractures may be influenced by primary and secondary fracture orientations in the formation.

The simulations at 640 can predict the locations and properties of fractures that may form in the subterranean formation during a injection treatment. As such, the input geometric models can each represent an initial condition of the foiination, and the output geometric models (as generated and/or modified by fracture propagation simulation) can each represent an intemiediate or final condition of the formation. The output geometric model may include complex fracture pattern models generated by a simulation. The complex fracture pattern models may include networks of fractures that can extend, for example, to a well bore, along multiple azimuths, in multiple different planes and directions, along discontinuities in rock, and in multiple regions of a reservoir.

In the example shown in FIG. 6B, the fracture propagation is simulated by modeling, at 642, the forces acting on each rock block represented by the input geometric model. The forces may include, for example, forces of friction, shear forces, normal forces, external forces, forces generated by steady state or unsteady state fluid flow, forces generated by drilling activities, naturally generated forces, and/or others. In the example shown in FIG. 6B, the forces modeled at 642 can lead to translation (644*a*), rotation (644*b*), and/or fracture (644*c*) of any of the rock blocks of the geometric model. In some cases, the rock blocks may deform, crack, and/or otherwise be modified during the simulation. In some instances, artificial fractures may be initiated and/or propagated as a result of the modeled forces. In some instances, natural and/or artificial fractures may be dilated as a result of the modeled forces.

In some instances, the output geometric models generated by the simulation at 640 can be analyzed to generate output probability distributions, at 652. For example, properties of the simulated complex fracture patterns in each geometric model can be summarized in output probability distributions. An output probability distribution may, for example, identify probabilities of complex fracture spacing, probabilities of complex fracture length, probabilities of complex fracture size and shape, and/or others. For example, the output geometric models from the multiple realizations may be analyzed to identify a most likely result of a given injection treatment; the output geometric models from the multiple realizations may be analyzed to identify a least likely result of a given injection treatment; the output geometric models from the multiple realizations may be analyzed to identify a range of possible results of a given injection treatment, and in some cases, a probability associated with each possible result. Example results may include properties of the complex fracture network, properties of the complex fractures, and/or other properties. In a particular example, analysis of the output geometric models can predict a probability of having a fracture that contacts a given amount of rock (e.g., a ten percent chance of having a fracture that contacts one hundred square feet of rock, a forty percent chance of having a fracture that contacts eighty square feet or rock, etc.). As another example, the connectivity and/or permeability of an output fracture pattern may be analyzed.

In some instances, the output geometric models generated by the simulation at 640 can be used to simulate (or otherwise calculate or estimate) production of resources from the subterranean formation at 654. For example, a flow of resident fluids through the simulated fracture pattern model may be simulated. In some cases, the production simulations may predict a volume, location, flow rate, and/or other properties of resource production through the fracture network.

At 656, injection treatment parameters can be modified and/or selected. The modification and/or selection of injection treatment parameters can be based on the analysis of the output models (at 652) and/or the simulated production (at 654). For example, injection treatment parameters may be selected to improve and/or optimize production from the reservoir.

At 658, a injection treatment is applied to the subterranean formation. For example, the injection treatment may be applied as described with respect to FIGS. 1B, 1D, and/or in another manner. Properties and/or settings of the applied injection treatment can be set according to the injection treatment parameters selected and/or modified at 656. For example, a flow rate, flow volume, flow pressure, slurry concentration, injection location, fluid composition, and/or other properties may be designated based at least in part on the results of simulations of complex fracture propagation.

Figure 7A:
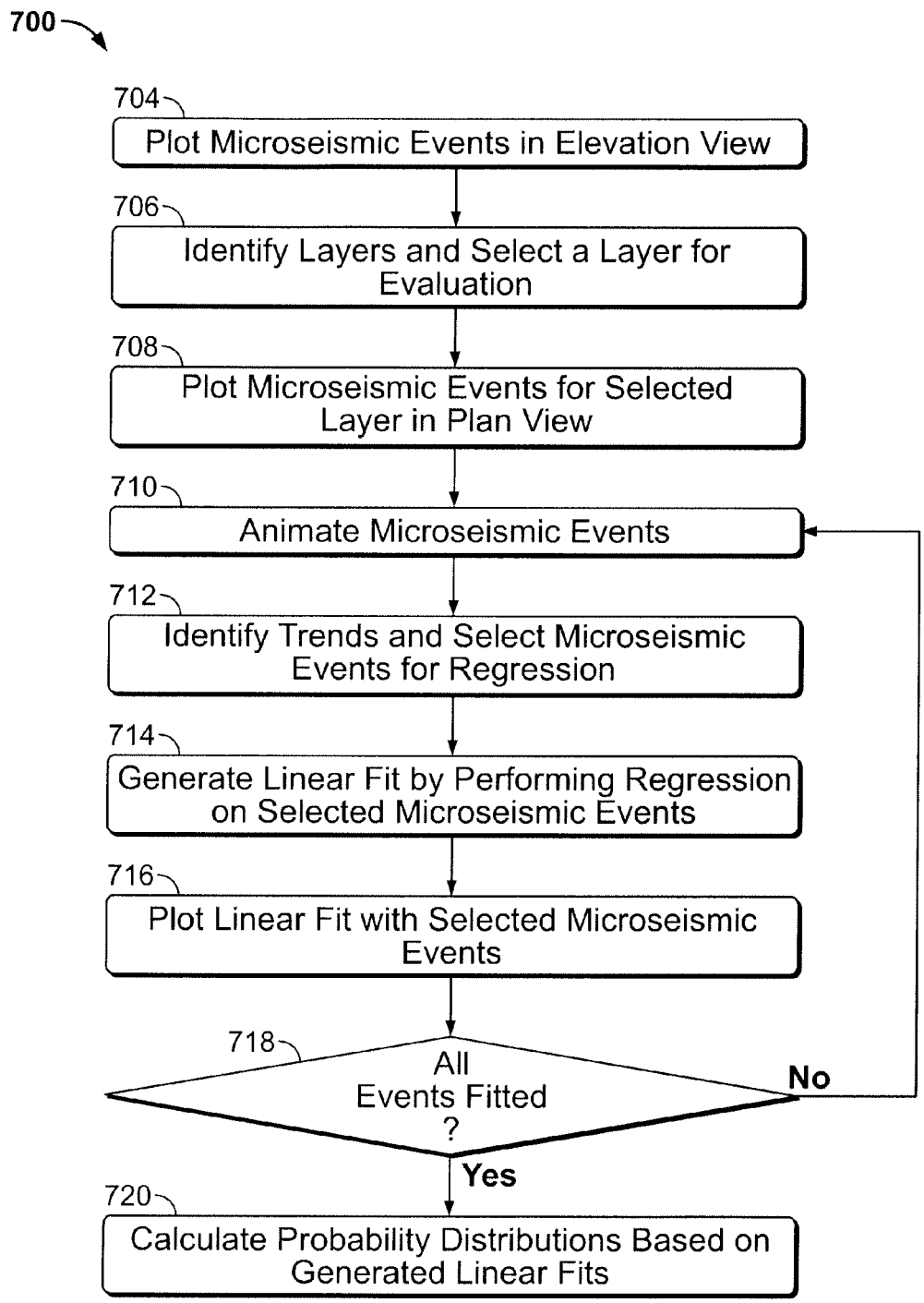
FIG. 7A is a flow chart of an example technique for fitting microseismic event data.
Figure 7B:
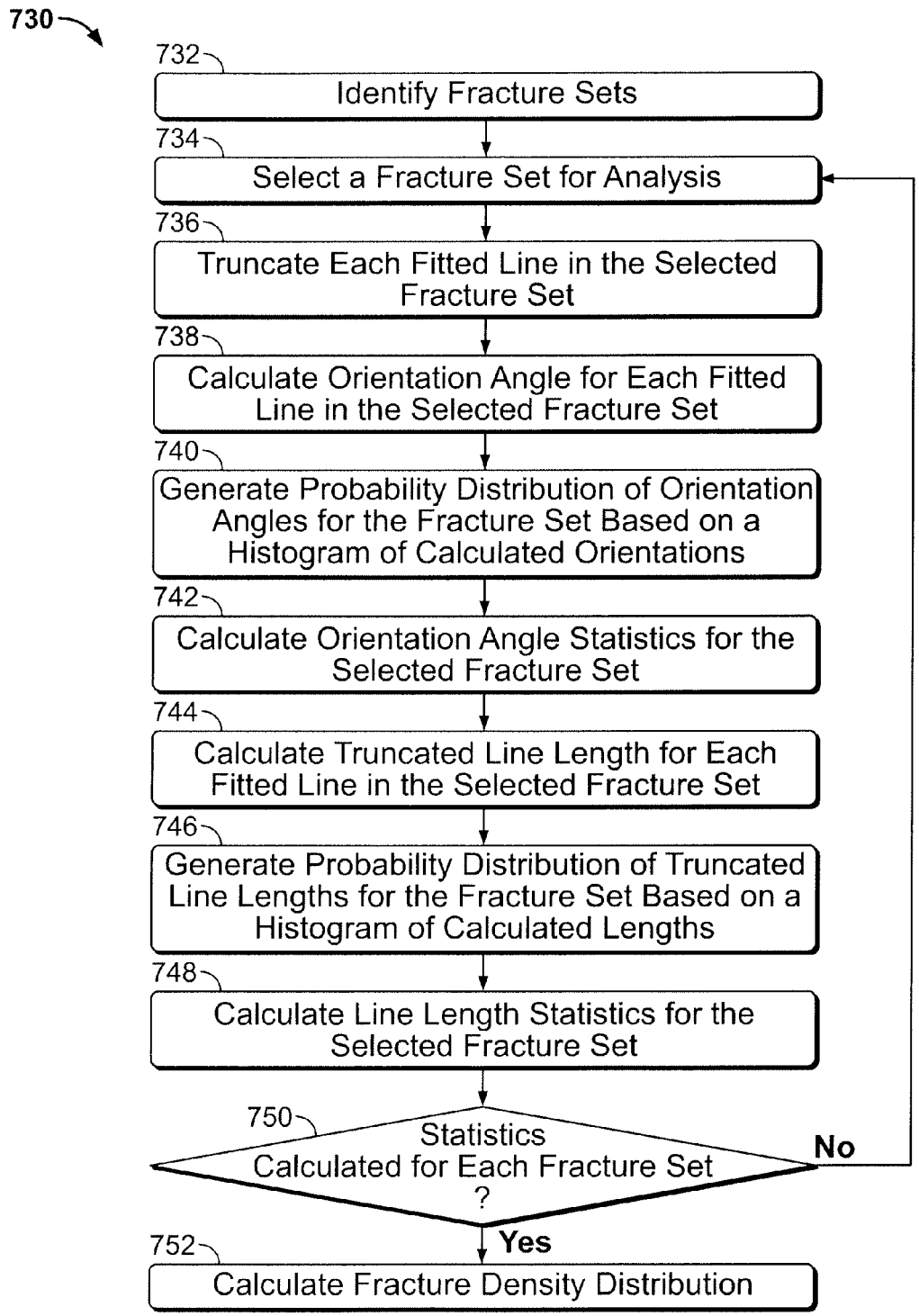
FIG. 7B is a flow chart of an example technique for generating a probability distribution.
Figure 7C:
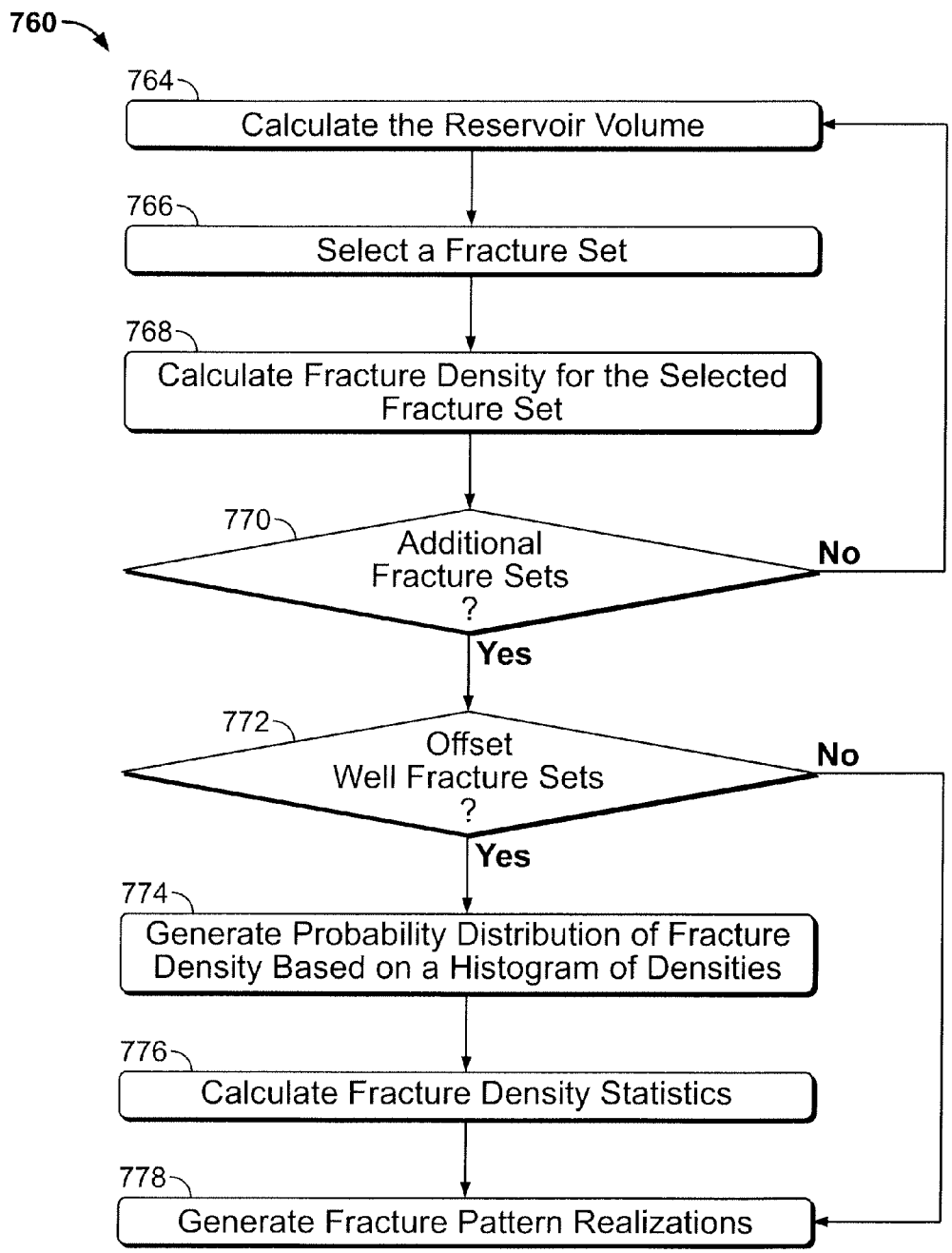
FIG. 7C is a flow chart of an example technique for generating a probability distribution.

FIGS. 7A, 7B, and 7C show example techniques for generating probability distributions. In some implementations, one or more of the operations and/or example processes shown in FIGS. 7A, 7B, and 7C may be used to generate an initial probability distribution representing one or more characteristics of a subterranean region. The characteristic represented by the probability distribution may include, for example, natural fracture parameters, and/or other types of characteristics. In some implementations, one or more of the processes shown in FIGS. 7A, 7B, and 7C, or a similar process, may be used to perform all or part of obtaining initial probability distributions at 602 in FIG. 6A. In some implementations, one or more of the processes shown in FIGS. 7A, 7B, and 7C, or a similar process, may be used to generate a probability distribution included in the probabilistic earth model obtained at 632 in FIG. 6B.

The example processes shown in FIGS. 7A, 7B, and 7C may include one or more iterated operations and/or one or more iterated subsets of operations. Some or all of the operations in the example processes shown in FIGS. 7A, 7B, and 7C can be implemented by one or more computing devices. Any of the selections made and/or identified in the example processes shown in FIGS. 7A, 7B, and 7C may be made and/or identified by an automated process and/or based on user input. In some implementations, the example processes shown in FIGS. 7A, 7B, and 7C may include additional, fewer, and/or different operations performed in the same or a different order. Moreover, one or more of the individual operations and/or subsets of the operations in the example processes shown in FIGS. 7A, 7B, and 7C can be performed in isolation and/or in different contexts to perform one or more of the disclosed techniques. Output data generated by the example processes shown in FIGS. 7A, 7B, and 7C, including output generated by intermediate operations, can include stored, displayed, printed, communicated, transmitted, and/or processed information.

FIG. 7A is a flow chart of an example process 700 for generating a linear fit for microseismic events. In some implementations, another type of fit may be generated for one or more of the microseismic events. For example, a non-linear curve fit may include a second-order (or higher order) polynomial, a sinusoidal curve, a logarithmic curve, and/or other types of curves. The linear fits may represent estimated locations, shapes, lengths, and/or other properties of a fracture in a subterranean formation. In some implementations, some or all of the operations of the process 700 may be carried out independent of user input. In some implementations, one or more of the operations of the process 700 utilize input from a user. For example, some implementations of the process 700 may require a user to identify, designate, and/or modify linear trends in microseismic data.

At 704, microseismic event data for a subterranean region are plotted in an elevation view. For example, pane 502 in FIG. 5 shows an elevation view of example microseismic event data. The microseismic event data may include data recorded during injection operations, production operations, and/or other operations. At 706, layers of the subterranean region are identified, and one or more layers are selected for evaluation. For example, the horizontal lines 508a and 508b in FIG. 5 indicate a layer of the subterranean region selected for evaluation. At 708, the microseismic events from the selected layer are plotted in a plan view. For example, in FIG. 5, pane 520 shows a plan view of the microseismic events in the selected layer. At 710, the microseismic events in the selected layer may be animated in the plan view plot. For example, two or more of the plotted points in pane 520 of FIG. 5 may be animated based on the relative times at which the microseismic events occurred. At 712, linear trends may be identified, for example, based on the animation and/or other information. Microseismic events demonstrating a linear trend are selected for regression.

At 714, a linear regression may be performed on the selected microseismic events. The linear regression generates an equation for a straight line that fits the selected microseismic events. For example, linear regression may be performed by a least-squares technique and/or other types of regression techniques. In some implementations, the microseismic events may be fitted to a non-linear curve using an appropriate regression analysis. For example, in some cases, the microseismic events may be fitted to a polynomial curve (e.g., second order, third order, etc.) and/or another type of curve. At 716, a line representing the output of the linear regression may be plotted through the selected microseismic events in the plan view. At 718, it may be determined whether all events (e.g., all events in the selected layer and/or all events in another subset of the data) have been fitted. If one or more microseismic events have not been fitted, the process 700 may return to operation 710, and the operations may be iterated until all microseismic events in the selected layer have been fitted. In the example shown, if it is determined at 718 that all of the microseismic events have been fitted, probability distributions may be generated at 720. In some implementations, one or more of the example processes shown in FIGS. 7B and 7C and/or another process may be used to generate the probability distributions at 720.

FIG. 7B is a flow chart of an example process 730 for generating probability distributions for fracture orientation and fracture trace length. A similar process may be used to generate probability distributions for one or more other fracture parameters (e.g., fracture aperture, fracture shape, fracture size, fracture dip angle, and/or others). In some implementations, some or all of the operations of the process 730 may be carried out independent of user input. In some implementations, one or more of the operations of the process 730 may utilize input from a user.

At 732, multiple fracture sets are identified. For example, each fracture set may include linear fits generated by the process 700 in FIG. 7A, where each linear fit represents an estimated fracture location. Typically, a fracture set contains fractures having orientation angles within about plus or minus thirty degrees (±30° of the mean orientation for the fracture set. Fracture sets can be identified using stereo-projection techniques. In some implementations, fracture sets can be identified graphically from a map of microseismic events and/or the linear fits. In some cases, there are a small number (e.g., 2, 3, etc.) of fracture sets, the fracture-dip angle is assumed to be π/2, and the linear fits are grouped into fracture sets. After grouping the linear fits into fracture sets, the mean orientation angle for each fracture set is calculated and compared to the orientation angle of each linear fit in the fracture set. If the orientation angle of a linear fit differs from the mean orientation angle for the fracture set by more than a limiting angle ($\pm\theta_{max}$) the linear fits may be regrouped, and the process can be repeated until the orientation angles of each linear fit are within the limiting angle ($\pm\theta_{max}$) of the mean orientation angle for the fracture set. In some implementations, the limiting angle ($\theta_{max}$) is about thirty degrees (30°. Other values of the limiting angle may be used.

Probability distributions for fracture properties (e.g., fracture orientation, fracture trace length, fracture density, fracture spacing, and/or other fracture properties) can be generated based on each fracture set. At 734, one of the fracture sets is selected for analysis. Each linear fit in the selected fracture set may include an equation of an infinite straight line generated by a regression fit, such as the regression fit performed at 714 in FIG. 7A. In reality, fractures have finite lengths. At 736, the fitted lines of the selected fracture set are truncated. The truncation points may be arbitrary, since the fractures are not observed directly. The truncation points for a linear fit may be selected based on the locations of the microseismic events that were used to generate the linear fit, based on the error bars of the microseismic events that were used to generate the linear fit, based on user input, for example, through a graphical user interface, based on classical field outcrop-mapping fracture trace-length measurements, based on other information, and/or a combination of these. Additionally or alternatively, the truncation points for a linear fit may be selected and/or modified by adding or subtracting an arbitrary length from the linear-trend ending events. The lengths of the truncated linear fits may be used as an estimated fracture trace length for a fracture.

At 738, the orientation angle for each linear fit in the selected fracture set is calculated. The orientation angle may be calculated from a reference orientation, for example, an East line or another reference angle. At 740, a probability distribution of orientation angles is generated for the fracture set based on a histogram of calculated orientations. For example, a histogram of orientation angles may be generated, and the histogram may indicate, for multiple discrete ranges of orientation angle, the number of linear fits in the selected fracture set having an orientation angle in each discrete range. A probability distribution function can be selected, parameterized, and/or otherwise generated based on the histogram. For example, the histogram may correspond to a normal distribution, log normal distribution, negative exponential distribution, and/or another type of distribution. At 742, orientation angle statistics for the selected fracture set are calculated. For example, the mean orientation angle, the standard deviation of the orientation angle, and/or other statistics may be calculated based on the histogram and/or based on other data.

At 744, the line length for each truncated linear fit in the selected fracture set is calculated. For example, the line length may be calculated based on the truncation points selected at 736, based on the error bars, and/or based on other information. At 746, a probability distribution of line lengths is generated for the fracture set based on a histogram of the calculated lengths. For example, a histogram of line lengths may be generated, and the histogram may indicate, for multiple discrete ranges of line length, the number of truncated linear fits in the selected fracture set having line length in each discrete range. A probability distribution function can be selected, parameterized, and/or otherwise generated based on the histogram. For example, the histogram may correspond to a normal distribution, log normal distribution, negative exponential distribution, and/or another type of distribution. At 748, line length statistics for the selected fracture set are calculated. For example, the mean line length, the standard deviation of the line length, and/or other statistics may be calculated based on the histogram and/or based on other data.

At 750, it is determined whether orientation angle statistics and line length statistics have been calculated for each fracture set. If statistics have not been calculated for a fracture set, the process 730 may return to operation 734, and the operations may be iterated until statistics have been calculated for all fracture sets. When statistics have been calculated for each fracture set, the fracture density distribution may be calculated at 752. In some implementations, the example process shown in FIG. 7C and/or another process may be used to generate the fracture density distribution at 752.

FIG. 7C is a flow chart of an example process 760 for generating a probability distribution for fracture density. A similar process may be used to generate probability distributions for one or more other fracture parameters. In some implementations, some or all of the operations of the process 760 may be carried out independent of user input. In some implementations, one or more of the operations of the process 760 may utilize input from a user.

In some implementations, the process 760 may be performed after and/or in connection with the process 700 of FIG. 7A and/or the process 730 of FIG. 7B. For example, the process 760 may initially obtain microseismic data, fracture cluster data, and/or other data pertaining to a subterranean region. Fracture cluster data may include one or more fracture sets, such as the fracture sets identified at 732. Fracture clusters can be located in a stimulated reservoir volume, and at 764, a volume of the stimulated reservoir is calculated. The reservoir volume may be calculated based on the spatial and/or planar extent of microseismic event data, and/or based on other information. In some instances, reliable probability distributions describing fracture cluster properties cannot be generated based on microseismic events within a single stimulated reservoir volume, and analysis of fracture sets in multiple stimulated reservoir volumes may be required to generate reliable probability distributions for the fracture cluster properties.

At 766, a fracture set is selected. At 768, a fracture density for the selected fracture set is calculated. For example, the fracture density may be calculated as the number of fractures within the reservoir volume divided by the calculated reservoir volume. At 770, if a fracture density has not been calculated for each fracture set, the process 760 returns to 764, and the operations are iterated until a fracture density has been calculated based on all of the fracture sets. After a fracture density has been calculated based on all fracture sets, the process 760 proceeds to 772.

At 772, it is determined whether there are fracture sets for any offset wells in the reservoir. If there are no offset well fracture sets, the example process 760 may proceed to 778, where fracture pattern realizations are generated. For example, in some implementations, the fracture pattern realizations may be generated as in operation 606 of FIG. 6A, and/or fracture pattern realizations may be generated in a different manner.

At 772, if there are fracture sets for one or more other wells in the reservoir, the example process 760 may proceed to 774, where a probability distribution of fracture density is generated based on a histogram of fracture density for the reservoir. To calculate a fracture density distribution, the stimulated reservoir volumes corresponding to multiple mappings in a horizontal well, the stimulated reservoir volumes from offset wells in the region, and/or other volumes may be combined with the treatment stimulated reservoir volume to prepare a fracture set density histogram. For example, a histogram of fracture densities may be generated based on fracture sets for multiple offset wells in the reservoir. The histogram may indicate, for multiple discrete ranges of fracture density, the number of fracture patterns having a fracture density in each discrete range. A probability distribution function can be selected, parameterized, and/or otherwise generated based on the histogram. For example, the histogram may correspond to a normal distribution, log normal distribution, negative exponential distribution, and/or another type of distribution. At 776, fracture density statistics for the reservoir are calculated. For example, the mean fracture density, the standard deviation of the fracture density, and/or other statistics may be calculated based on the histogram and/or based on other data.

Any of the operations and/or processes shown in FIGS. 7A, 7B, and 7C may be used in connection with a two-dimensional analysis, a three-dimensional analysis, and/or other types of analysis. For example, one or more of the described processes may be adapted for three-dimensional analysis by identifying planar trends in a three-dimensional map of microseismic events. In some implementations, identifying and/or correlating data for multiple planes may also provide data for generating a probability distribution for fracture dip angle.

Some embodiments of subject matter and operations described in this specification can be implemented in digital electronic circuitry, or in computer software, firmware, or hardware, including the structures disclosed in this specification and their structural equivalents, or in combinations of one or more of them. Some embodiments of subject matter described in this specification can be implemented as one or more computer programs, i.e., one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. The processor and the memory can be supplemented by, or incorporated in, special purpose logic circuitry.

In some implementations, a processor may include a graphics processing unit (GPU) and/or a numerical processing unit (NPU). A GPU or NPU may be used to perform computations in parallel. For example, using such devices may improve the speed and/or reduce the time required for simulating complex fracture propagation, for generating natural fracture pattern models, for predicting responses of rock blocks to forces, for refining probability distributions, for generating input and/or output subterranean formation models, and/or for other computing tasks and operations described herein. Some example GPUs include GPUs distributed by NVIDIA, which can be operated under the CUDA instruction set architecture. Alternatively or additionally, other GPUs may be used, such as, for example, GPUs distributed by ATI Technologies, Inc (ATI).

To provide for interaction with a user, embodiments of the subject matter described in this specification can be implemented on a computer having a display device (e.g., a CRT (cathode ray tube) or LCD (liquid crystal display) monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A client and server are generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In the present disclosure, "each" refers to each of multiple items or operations in a group, and may include a subset of the items or operations in the group and/or all of the items or operations in the group. In the present disclosure, the term "based on" indicates that an item or operation is based at least in part on one or more other items or operations—and may be based exclusively, partially, primarily, secondarily, directly, or indirectly on the one or more other items or operations.

A number of embodiments of the invention have been described. Nevertheless, it will be understood that various modifications may be made without departing from the spirit and scope of the invention. Accordingly, other embodiments are within the scope of the following claims.

The invention claimed is:

1. A non-transitory computer-readable medium encoded with instructions that, when executed, perform operations comprising:
   generating a plurality of distinct fracture pattern models based on sampling an initial probability distribution of values for a fracture parameter, each distinct fracture pattern model including a distinct set of model fracture locations;
   comparing the set of model fracture locations in each fracture pattern model to microseismic event locations for a subterranean region, the same microseismic event locations being compared against each distinct set of model fracture locations, wherein comparing the set of model fracture locations comprises:
      generating a plurality of map images, each map image comprising a representation of one of the plurality of fracture pattern models and a representation of the microseismic event locations;
      presenting the plurality of map images in a graphical user interface; and
      at least one of:
         receiving user input through the graphical user interface, the user input identifying at least one of the fracture pattern models as an accurate representation of the microseismic event locations; or
         receiving user input through the graphical user interface, the user input identifying at least one of the fracture pattern models as an inaccurate representation of the microseismic event locations; and
   generating, from the initial probability distribution, a refined probability distribution for the fracture parameter based on the comparison between the model fracture locations and the microseismic event locations.

2. The computer-readable medium of claim 1, wherein sampling the initial distribution comprises randomly selecting a plurality of sample values from the initial distribution, and generating the refined distribution comprises selecting a subset of the sample values based on the comparing.

3. The computer-readable medium of claim 1, wherein the comparing comprises determining that at least one of the fracture pattern models has a correlation with the microseismic event locations that is higher than a threshold correlation.

4. The computer-readable medium of claim 1, wherein the comparing comprises determining that at least one of the fracture pattern models has a correlation with the microseismic event locations that is lower than a threshold correlation.

5. The computer-readable medium of claim 1, wherein the plurality of fracture pattern models comprises a first fracture pattern model and a second fracture pattern model, the first fracture pattern model has a first correlation with the microseismic event locations, the second fracture pattern model has a second correlation with the microseismic event locations, and the comparing comprises determining that the first correlation is higher than the second correlation.

6. The computer-readable medium of claim 1, wherein the microseismic event locations include information on event locations of a plurality of measured microseismic events, and comparing the set of model fracture locations in each fracture pattern model to microseismic event locations comprises calculating for each fracture pattern model a least distance from each of the event locations to one of the fractures in the fracture pattern model.

7. The computer-readable medium of claim 6, wherein the comparing further comprises weighting the least distance for each event location based on an event magnitude for the measured microseismic event associated with the event location.

8. The computer-readable medium of claim 1, wherein the plurality of fracture pattern models comprise natural fracture pattern models.

9. A computer-implemented method for simulating an injection treatment, the method comprising:
   receiving a plurality of distinct fracture models, each fracture model indicating a distinct model location for one or more subterranean fractures, each of the fracture models being based on an initial probability distribution of values for a fracture parameter; and
   generating, by operation of data processing apparatus, a refined probability distribution of values for the fracture parameter based on comparing the distinct model location in each fracture model against a common set of measured locations of microseismic events in a subterranean region, wherein the comparing comprises:
      generating a plurality of map images, each map image comprising a representation of one of the plurality of fracture models and a representation of the measured locations of the microseismic events;
      presenting the plurality of map images in a graphical user interface; and
      at least one of:
         receiving user input through the graphical user interface, the user input identifying at least one of the fracture models as an accurate representation of the measured locations of the microseismic events; or
         receiving user input through the graphical user interface, the user input identifying at least one of the fracture models as an inaccurate representation of the measured locations of the microseismic events.

10. The method of claim 9, wherein a first volume of the subterranean region comprises the measured locations, and the method further comprises predicting a natural fracture pattern in a second volume of the subterranean region based on the refined distribution.

11. The method of claim 10, wherein the subterranean region includes a horizontal well bore, the first volume surrounds a first portion of the horizontal well bore, the second volume surrounds a second portion of the horizontal well bore.

12. The method of claim 9, wherein the fracture parameter comprises at least one of a fracture dip angle, a fracture density, a fracture direction, a fracture shape, a fracture aperture, a fracture persistence, a fracture length, or a fracture spacing.

13. The method of claim 9, wherein the initial distribution comprises a plurality of values for the fracture parameter and a probability for each of the plurality of values, and generating the refined distribution comprises increasing or decreasing the probability for at least one of the plurality of values.

14. The method of claim 9, comprising:
receiving a plurality of fracture pattern models each comprising information on model locations of subterranean fractures, each fracture pattern model based on an independent sampling of the initial distribution of values for the fracture parameter,
wherein the refined distribution is generated based on comparing each of the fracture pattern models and the measured locations of the microseismic events.

15. The method of claim 14, wherein comparing each of the fracture pattern models and the measured locations of the microseismic events comprises determining distances between the measured locations of the microseismic events and the model locations of each fracture pattern model.

16. The method of claim 15, wherein comparing each of the fracture pattern models and the measured locations of the microseismic events further comprises at least one of:
determining that one or more of the fracture pattern models correlates with the locations of the microseismic events based on the distances; or
determining that one or more of the fracture pattern models does not correlate with the locations of the microseismic events based on the distances.

17. The method of claim 9, further comprising using the refined distribution to predict values of the parameter for a second subterranean region.

18. The method of claim 9, further comprising determining an operating parameter for an injection treatment based on the refined distribution, wherein the operating parameter comprises at least one of a fluid injection flow rate, a fluid injection flow volume, a fluid injection location, a proppant property, or an injection slurry concentration.

19. A system for performing an injection treatment, the system comprising:
an injection treatment control subsystem adapted to control an injection treatment applied to a subterranean formation through a well bore defined in the subterranean formation, the injection treatment based on a predicted probability distribution of values for a natural fracture parameter; and
a computing subsystem adapted to:
generate a plurality of distinct fracture pattern models by sampling an initial probability distribution of values for the natural fracture parameter, each distinct fracture pattern model including a distinct set of model fracture locations; and
generate the predicted probability distribution from the initial probability distribution based on comparing the set of model fracture locations in each of the fracture pattern models to microseismic event locations for a subterranean region, the same microseismic event locations being compared against each distinct set of model fracture locations, wherein the comparing comprises:
generating a plurality of map images, each map image comprising a representation of one of the plurality of fracture pattern models and a representation of the microseismic event locations;
presenting the plurality of map images in a graphical user interface; and
at least one of:
receiving user input through the graphical user interface, the user input identifying at least one of the fracture pattern models as an accurate representation of the microseismic event locations; or
receiving user input through the graphical user interface, the user input identifying at least one of the fracture pattern models as an inaccurate representation of the microseismic event locations.

20. The system of claim 19, the subterranean formation residing outside of the subterranean region.

21. The system of claim 19, the subterranean formation residing in the subterranean region.

22. The system of claim 19, the computing subsystem further adapted to:
simulate fracture propagation in the subterranean formation; and
determine at least one aspect of the injection treatment based on the simulation.

23. The system of claim 19, further comprising the subterranean formation, the subterranean formation comprising at least one of shale, sandstone, carbonates, or coal.

24. The system of claim 19, wherein the well bore comprises a horizontal well bore.

25. A method of treating a subterranean formation, the method comprising:
generating a plurality of distinct fracture pattern models based on a probability distribution of values for a fracture parameter, each distinct fracture pattern model including a distinct set of model fracture locations;
generating, by operation of one or more computers, an updated probability distribution based on correlations between the fracture pattern models and microseismic event locations for a subterranean formation, the correlations being identified by comparing the same set of microseismic event locations against each distinct set of fracture model locations, wherein generating the updated probability distribution comprises:
generating a plurality of map images, each map image comprising a representation of one of the plurality of fracture pattern models and a representation of the microseismic event locations;
presenting the plurality of map images in a graphical user interface; and
at least one of:
receiving user input through the graphical user interface, the user input identifying at least one of the fracture pattern models as an accurate representation of the microseismic event locations; or
receiving user input through the graphical user interface, the user input identifying at least one of the fracture pattern models as an inaccurate representation of the microseismic event locations;
designing an injection treatment based on the updated probability distribution; and
using an injection treatment control subsystem to apply the injection treatment to the subterranean formation through a well bore in the subterranean formation.

26. The method of claim 25, wherein applying the injection treatment comprises applying a second injection treatment to the subterranean formation at a second fluid injection location, the method further comprising detecting the microseismic event locations during a first injection treatment applied to the subterranean formation at a first fluid injection location.

27. The method of claim 26, further comprising applying the first fluid injection treatment to the subterranean formation at the first fluid injection location through the well bore.

28. The method of claim 27, wherein the well bore comprises a horizontal well bore comprising the first fluid injection location and the second fluid injection location, and the second fluid injection location is horizontally offset from the first fluid injection location.

29. The method of claim 26, wherein the microseismic event locations represent microseismic events in a first portion of the subterranean formation, and the second fluid injection treatment is applied to a second portion of the subterranean formation.

30. The method of claim 25, wherein applying the injection treatment comprises injecting treatment fluid into the subterranean formation at an injection pressure less than a fracture initiation pressure for the subterranean formation.

31. The method of claim 25, wherein applying the injection treatment comprises injecting treatment fluid into the subterranean formation at an injection pressure greater than or equal to a fracture initiation pressure for the subterranean formation.

32. The method of claim 25, wherein applying the injection treatment comprises injecting treatment fluid into the subterranean formation at an injection pressure less than a fracture closure pressure for the subterranean formation.

33. The method of claim 25, wherein applying the injection treatment comprises injecting treatment fluid into the subterranean formation at an injection pressure greater than or equal to a fracture closure pressure for the subterranean formation.

34. The method of claim 25, wherein applying the injection treatment initiates a fracture in the subterranean formation.

35. The method of claim 25, wherein applying the injection treatment dilates a natural fracture in the subterranean formation.

36. The method of claim 25, wherein the injection treatment comprises at least one of a pad phase of a fracture treatment or a proppant-laden phase of a fracture treatment.

37. The method of claim 25, wherein designing the injection treatment comprises generating a natural fracture model for the subterranean formation based on the updated distribution and selecting an injection treatment plan based on the natural fracture model.

38. The computer-readable medium of claim 1, wherein the comparing determines a degree of correlation between each distinct fracture pattern model and the microseismic event locations, and the refined probability distribution is generated by modifying the initial probability distribution based on one or more fracture pattern models having an acceptable degree of correlation with the microseismic events.

39. The computer-readable medium of claim 38, wherein the degree of correlation for each fracture pattern model is a binary value indicating that the fracture pattern model does or does not have an acceptable degree of correlation with the microseismic events.

* * * * *